(12) United States Patent
Resch et al.

(10) Patent No.: US 11,737,629 B2
(45) Date of Patent: *Aug. 29, 2023

(54) SURFACE CLEANING APPARATUS

(71) Applicant: BISSELL Inc., Grand Rapids, MI (US)

(72) Inventors: Jacob Resch, Rockford, MI (US);
Jacob S. Boles, Kentwood, MI (US)

(73) Assignee: BISSELL Inc., Grand Rapids, MI (US)

( * ) Notice: Subject to any disclaimer, the term of this patent is extended or adjusted under 35 U.S.C. 154(b) by 302 days.

This patent is subject to a terminal disclaimer.

(21) Appl. No.: 17/346,382

(22) Filed: Jun. 14, 2021

(65) Prior Publication Data
US 2021/0298554 A1 Sep. 30, 2021

Related U.S. Application Data

(60) Division of application No. 17/016,824, filed on Sep. 10, 2020, now Pat. No. 11,071,428, which is a
(Continued)

(51) Int. Cl.
| A47L 9/28 | (2006.01) |
| A47L 5/30 | (2006.01) |
| A47L 11/30 | (2006.01) |
| A47L 11/40 | (2006.01) |
| B08B 3/04 | (2006.01) |

(Continued)

(52) U.S. Cl.
CPC ............ *A47L 9/2873* (2013.01); *A47L 5/30* (2013.01); *A47L 7/0004* (2013.01); *A47L 11/185* (2013.01); *A47L 11/302* (2013.01); *A47L 11/4005* (2013.01); *A47L 11/4008* (2013.01); *A47L 11/4011* (2013.01); *A47L 11/4041* (2013.01); *A47L 11/4094* (2013.01); *B08B 3/04* (2013.01); *B60L 53/10* (2019.02); *A46B 17/06* (2013.01); *A47L 11/4019* (2013.01); *A47L 11/4025* (2013.01); *A47L 11/4027* (2013.01); *A47L 11/4083* (2013.01);
(Continued)

(58) Field of Classification Search
CPC .... A47L 9/2873; A47L 9/0063; A47L 9/2889; A47L 2201/022; A47L 2201/028
See application file for complete search history.

(56) References Cited

U.S. PATENT DOCUMENTS

| 889,823 A | 6/1908 | Spangler |
| 1,694,937 A | 12/1928 | Floeter |

(Continued)

FOREIGN PATENT DOCUMENTS

| CN | 1953692 A | 4/2007 |
| CN | 101816535 A | 9/2010 |

(Continued)

*Primary Examiner* — Bryan R Muller
(74) *Attorney, Agent, or Firm* — WARNER NORCROSS + JUDD LLP

(57) ABSTRACT

The present disclosure provides a surface cleaning apparatus that includes a housing including a base adapted for movement across a surface to be cleaned, a fluid delivery system, and a recovery system. The surface cleaning apparatus can be configured to clean multiple surfaces, including hard and soft surfaces, and for different cleaning modes, including wet cleaning, dry vacuum cleaning, and self-cleaning. Methods for self-cleaning a surface cleaning apparatus are also provided.

8 Claims, 26 Drawing Sheets

Related U.S. Application Data continuation of application No. 16/734,708, filed on Jan. 6, 2020, now Pat. No. 11,304,581.

(60) Provisional application No. 62/789,661, filed on Jan. 8, 2019.

(51) Int. Cl.
| | |
|---|---|
| *A47L 7/00* | (2006.01) |
| *A47L 11/18* | (2006.01) |
| *B60L 53/10* | (2019.01) |
| *A46B 17/06* | (2006.01) |

(52) U.S. Cl.
CPC ........ *A47L 11/4088* (2013.01); *A47L 11/4097* (2013.01); *B08B 2209/027* (2013.01)

(56) References Cited

U.S. PATENT DOCUMENTS

| | | | |
|---|---|---|---|
| 4,458,377 A | 7/1984 | Frohbieter | |
| 5,323,483 A | 6/1994 | Baeg | |
| 5,394,587 A | 3/1995 | Parise | |
| 5,608,944 A | 3/1997 | Gordon | |
| 5,815,884 A | 10/1998 | Imamura et al. | |
| 6,131,237 A | 10/2000 | Kasper et al. | |
| 6,446,302 B1 | 9/2002 | Kasper et al. | |
| 6,637,546 B1 | 10/2003 | Wang | |
| 6,832,407 B2 | 12/2004 | Salem et al. | |
| 6,864,985 B1 | 3/2005 | Tanzer | |
| 7,228,589 B2 | 6/2007 | Miner et al. | |
| 7,237,298 B2 | 7/2007 | Reindle et al. | |
| 7,269,877 B2 | 9/2007 | Tondra et al. | |
| 7,320,149 B1 | 1/2008 | Huffman et al. | |
| 8,719,998 B1 | 5/2014 | Huffman | |
| 8,925,142 B2 * | 1/2015 | Orubor | E01H 1/0836 15/322 |
| 9,474,424 B2 | 10/2016 | Moyher, Jr. et al. | |
| 9,549,648 B2 | 1/2017 | Lenkiewicz, Jr. et al. | |
| 9,737,187 B2 | 8/2017 | Bantum | |
| 10,092,155 B2 * | 10/2018 | Xia | A47L 11/4041 |
| 10,136,781 B2 | 11/2018 | Li et al. | |
| 11,141,035 B2 | 10/2021 | Zhang | |
| 11,229,342 B2 | 1/2022 | Conrad | |
| 2003/0201754 A1 * | 10/2003 | Conrad | A47L 9/2873 320/116 |
| 2005/0166358 A1 | 8/2005 | Lee et al. | |
| 2006/0101604 A1 | 5/2006 | Frederick et al. | |
| 2006/0101612 A1 | 5/2006 | Gordon et al. | |
| 2007/0145943 A1 | 6/2007 | Sudo | |
| 2008/0092325 A1 | 4/2008 | Vander Baan | |
| 2008/0148512 A1 * | 6/2008 | Beskow | A47L 11/302 15/350 |
| 2010/0088843 A1 * | 4/2010 | Reed | A47L 9/2873 320/112 |
| 2012/0152280 A1 | 6/2012 | Bosses et al. | |
| 2012/0284950 A1 | 11/2012 | De Wit et al. | |
| 2013/0025077 A1 | 1/2013 | De Wit et al. | |
| 2014/0182079 A1 | 7/2014 | Van Der Kooi et al. | |
| 2014/0215749 A1 | 8/2014 | Van Der Kooi et al. | |
| 2015/0020347 A1 | 1/2015 | Vail | |
| 2015/0191927 A1 | 7/2015 | Tavor et al. | |
| 2015/0250367 A1 | 9/2015 | Van Der Kooi et al. | |
| 2015/0297047 A1 | 10/2015 | Van Der Kooi et al. | |
| 2016/0256026 A1 | 9/2016 | Kuperus et al. | |
| 2016/0278597 A1 | 9/2016 | Braendle et al. | |
| 2017/0049288 A1 | 2/2017 | Knutson et al. | |
| 2017/0215676 A1 | 8/2017 | Moser et al. | |
| 2017/0324259 A1 | 11/2017 | Jung et al. | |
| 2018/0070787 A1 | 3/2018 | Gordon et al. | |
| 2018/0078106 A1 | 3/2018 | Scholten et al. | |
| 2018/0110388 A1 | 4/2018 | Xia et al. | |
| 2018/0116476 A1 | 5/2018 | Bloemendaal et al. | |
| 2018/0136042 A1 | 5/2018 | Goldring et al. | |
| 2018/0146833 A1 | 5/2018 | Halloran et al. | |
| 2018/0184870 A1 | 7/2018 | Moon et al. | |
| 2018/0221920 A1 | 8/2018 | Piwonka-Corle et al. | |
| 2018/0228331 A1 | 8/2018 | Moser et al. | |
| 2018/0333018 A1 * | 11/2018 | Deng | A47L 11/00 |
| 2018/0344112 A1 * | 12/2018 | Krebs | A47L 9/0063 |
| 2018/0344114 A1 | 12/2018 | Scholten et al. | |
| 2019/0020202 A1 * | 1/2019 | Wan | H01M 10/443 |
| 2020/0345190 A1 | 11/2020 | Buehler | |
| 2021/0244253 A1 | 8/2021 | Miller | |

FOREIGN PATENT DOCUMENTS

| | | |
|---|---|---|
| CN | 201734658 U | 2/2011 |
| CN | 202020380 U | 11/2011 |
| CN | 103120576 A | 5/2013 |
| CN | 104007765 A | 8/2014 |
| CN | 204207679 U | 3/2015 |
| CN | 205126117 | 4/2016 |
| CN | 205126122 | 4/2016 |
| CN | 205126125 | 4/2016 |
| CN | 205197904 | 5/2016 |
| CN | 205197912 | 5/2016 |
| CN | 105816101 B | 8/2016 |
| CN | 206151378 U | 5/2017 |
| CN | 2016151378 | 5/2017 |
| CN | 107007213 A | 8/2017 |
| CN | 107669219 A | 2/2018 |
| CN | 207055437 | 3/2018 |
| CN | 207384228 | 5/2018 |
| CN | 108778082 A | 11/2018 |
| CN | 108937719 A | 12/2018 |
| CN | 109106286 A | 1/2019 |
| CN | 109152502 A | 1/2019 |
| CN | 109381129 A | 2/2019 |
| CN | 110226899 A | 9/2019 |
| CN | 111134573 A | 5/2020 |
| CN | 111134572 B | 10/2021 |
| DE | 10201769 A1 | 6/2003 |
| EP | 2805659 B1 | 7/2019 |
| JP | 2003070706 A | 3/2003 |
| JP | 2008043035 A | 2/2008 |
| JP | 2014236898 A | 12/2014 |
| JP | 2016137095 A | 8/2016 |
| JP | 2016137165 A | 8/2016 |
| JP | 2017118598 A | 6/2017 |
| KR | 940008652 A | 5/1994 |
| KR | 20110097123 A | 8/2011 |
| KR | 20190092338 A | 8/2019 |
| TW | 201214921 A | 4/2012 |
| WO | 2010041184 | 4/2010 |
| WO | 2017124624 A1 | 7/2017 |
| WO | 2018177025 | 10/2018 |
| WO | 2020082066 A1 | 4/2020 |

* cited by examiner

SURFACE CLEANING APPARATUS

CROSS-REFERENCE TO RELATED APPLICATION(S)

This application is a division of U.S. patent application Ser. No. 17/016,824, filed Sep. 10, 2020, which is a continuation of U.S. patent application Ser. No. 16/734,708, filed Jan. 6, 2020, which claims the benefit of U.S. Provisional Patent Application No. 62/789,661, filed Jan. 8, 2019, all of which are incorporated by reference herein in their entirety.

BACKGROUND

Multi-surface vacuum cleaners are adapted for cleaning hard floor surfaces such as tile and hardwood and soft floor surfaces such as carpet and upholstery. Some multi-surface vacuum cleaners comprise a fluid delivery system that delivers cleaning fluid to a surface to be cleaned and a fluid recovery system that extracts spent cleaning fluid and debris (which may include dirt, dust, stains, soil, hair, and other debris) from the surface. The fluid delivery system typically includes one or more fluid supply tanks for storing a supply of cleaning fluid, a fluid distributor for applying the cleaning fluid to the surface to be cleaned, and a fluid supply conduit for delivering the cleaning fluid from the fluid supply tank to the fluid distributor. An agitator can be provided for agitating the cleaning fluid on the surface. The fluid recovery system typically includes a recovery tank, a nozzle adjacent the surface to be cleaned and in fluid communication with the recovery tank through a working air conduit, and a source of suction in fluid communication with the working air conduit to draw the cleaning fluid from the surface to be cleaned and through the nozzle and the working air conduit to the recovery tank. Other multi-surface cleaning apparatuses include "dry" vacuum cleaners which can clean different surface types, but do not dispense or recover liquid.

BRIEF SUMMARY

A surface cleaning apparatus is provided herein. In certain embodiments, the surface cleaning apparatus is a multi-surface wet vacuum cleaner that can be used to clean hard floor surfaces such as tile and hardwood and soft floor surfaces such as carpet.

According to another embodiment of the invention, a method for self-cleaning a surface cleaning apparatus docked at a cleaning tray is provided. The surface cleaning apparatus can include at least a battery, a fluid delivery system, and a recovery system having a recovery pathway. The method can include running an automatic cleanout cycle to self-clean at least a portion of the recovery pathway of the surface cleaning apparatus by powering a pump, a brush motor, and a vacuum motor with the battery.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF EMBODIMENTS OF THE INVENTION

The invention generally relates to a surface cleaning apparatus, which may be in the form of a multi-surface wet vacuum cleaner.

The functional systems of the surface cleaning apparatus can be arranged into any desired configuration, such as an upright device having a base and an upright body for directing the base across the surface to be cleaned, a canister device having a cleaning implement connected to a wheeled base by a vacuum hose, a portable device adapted to be hand carried by a user for cleaning relatively small areas, or a commercial device. Any of the aforementioned cleaners can be adapted to include a flexible vacuum hose, which can form a portion of the working air conduit between a nozzle and the suction source. As used herein, the term "multi-surface wet vacuum cleaner" includes a vacuum cleaner that can be used to clean hard floor surfaces such as tile and hardwood and soft floor surfaces such as carpet.

The cleaner can include a fluid delivery system for storing cleaning fluid and delivering the cleaning fluid to the surface to be cleaned and a recovery system for removing the spent cleaning fluid and debris from the surface to be cleaned and storing the spent cleaning fluid and debris.

The recovery system can include a suction nozzle, a suction source in fluid communication with the suction nozzle for generating a working air stream, and a recovery container for separating and collecting fluid and debris from the working airstream for later disposal. A separator can be formed in a portion of the recovery container for separating fluid and entrained debris from the working airstream. The recovery system can also be provided with one or more additional filters upstream or downstream of the motor/fan assembly. The suction source, such as a motor/fan assembly, is provided in fluid communication with the recovery container and can be electrically coupled to a power source.

The suction nozzle can be provided on a base or cleaning head adapted to move over the surface to be cleaned. An agitator can be provided adjacent to the suction nozzle for agitating the surface to be cleaned so that the debris is more easily ingested into the suction nozzle. The agitator can be driven by the same motor/fan assembly serving as the suction source, or may optionally be driven by a separate drive assembly, such as a dedicated agitator motor as shown herein.

Figure 1:
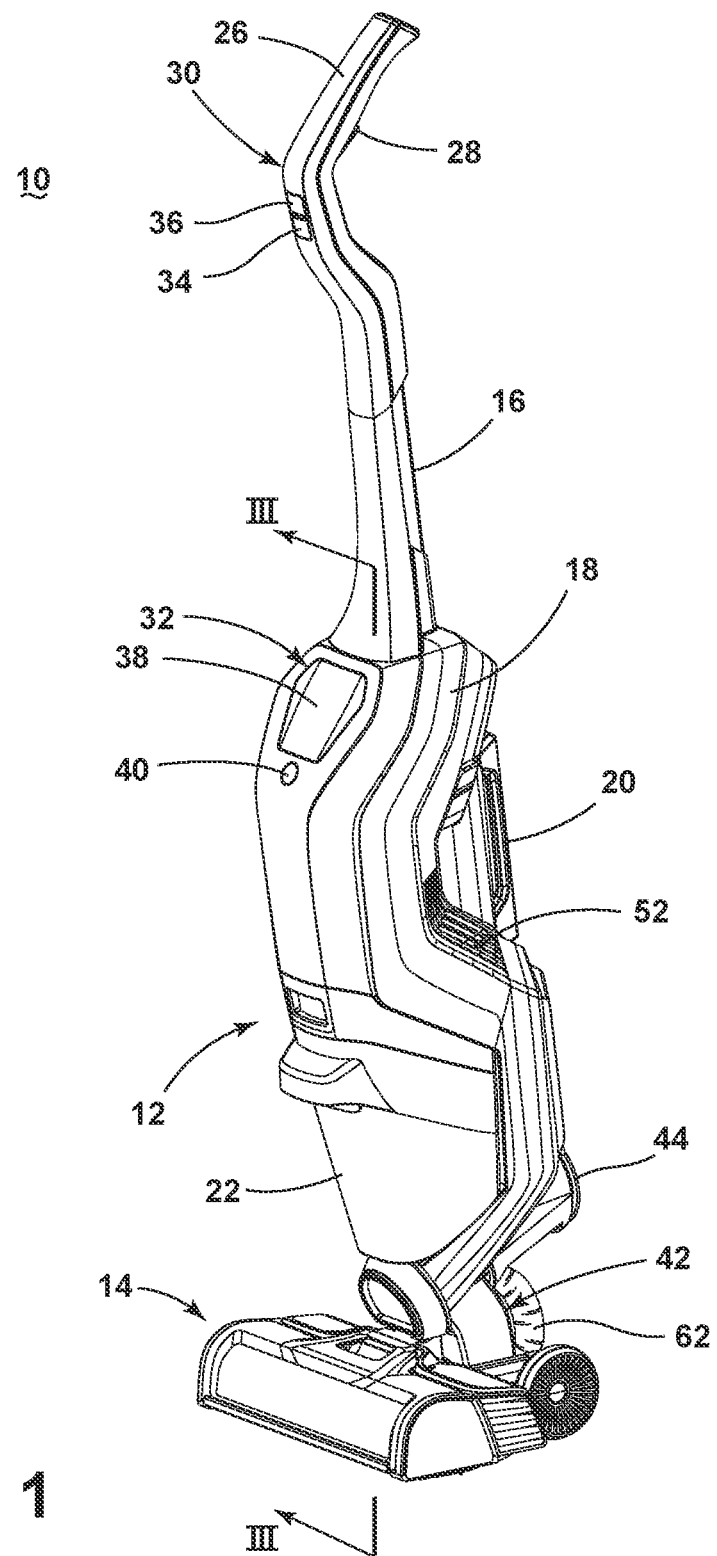
FIG. 1 is a perspective view of a surface cleaning apparatus according to one embodiment of the invention, showing the apparatus in an upright or storage position.

FIG. 1 is a perspective view of a surface cleaning apparatus 10 according to one aspect of the present disclosure. As discussed in further detail below, the surface cleaning apparatus 10 is provided with various features and improvements, which are described in further detail below. One example of a suitable surface cleaning apparatus in which the various features and improvements described herein can be used is disclosed in U.S. Pat. No. 10,092,155, issued Oct. 9, 2018, which is incorporated herein by reference in its entirety.

As illustrated herein, the surface cleaning apparatus 10 can be an upright multi-surface wet vacuum cleaner having a housing that includes an upright handle assembly or body 12 and a cleaning head or base 14 mounted to or coupled with the upright body 12 and adapted for movement across a surface to be cleaned. For purposes of description related to the figures, the terms "upper," "lower," "right," "left," "rear," "front," "vertical," "horizontal," "inner," "outer," and derivatives thereof shall relate to the disclosure as oriented in FIG. 1 from the perspective of a user behind the surface cleaning apparatus 10, which defines the rear of the surface cleaning apparatus 10. However, it is to be understood that the disclosure may assume various alternative orientations, except where expressly specified to the contrary.

The upright body 12 can comprise a handle 16 and a frame 18. The frame 18 can comprise a main support section supporting at least a supply tank 20 and a recovery tank 22, and may further support additional components of the body 12. The surface cleaning apparatus 10 can include a fluid delivery or supply pathway, including and at least partially defined by the supply tank 20, for storing cleaning fluid and delivering the cleaning fluid to the surface to be cleaned and a recovery pathway, including and at least partially defined by the recovery tank 22, for removing the spent cleaning fluid and debris from the surface to be cleaned and storing the spent cleaning fluid and debris until emptied by the user.

The handle 16 can include a hand grip 26 and a trigger 28 mounted to the hand grip 26, which controls fluid delivery from the supply tank 20 via an electronic or mechanical coupling with the tank 20. The trigger 28 can project at least partially exteriorly of the hand grip 26 for user access. A spring (not shown) can bias the trigger 28 outwardly from the hand grip 26. Other actuators, such as a thumb switch, can be provided instead of the trigger 28.

The surface cleaning apparatus 10 can include at least one user interface 30, 32 through which a user can interact with the surface cleaning apparatus 10. The at least one user interface can enable operation and control of the apparatus 10 from the user's end, and can also provide feedback information from the apparatus 10 to the user. The at least one user interface can be electrically coupled with electrical components, including, but not limited to, circuitry electrically connected to various components of the fluid delivery and recovery systems of the surface cleaning apparatus 10, as described in further detail below.

In the illustrated embodiment, the surface cleaning apparatus 10 includes a human-machine interface (HMI) 30 having one or more input controls, such as but not limited to buttons, triggers, toggles, keys, switches, or the like, operably connected to systems in the apparatus 10 to affect and control its operation. The surface cleaning apparatus 10 also includes a status user interface (SUI) 32 which communicates a condition or status of the apparatus 10 to the user. The SUI 32 can communicate visually and/or audibly, and can optionally include one or more input controls. The HMI 30 and the SUI 32 can be provided as separate interfaces or can be integrated with each other, such as in a composite use interface, graphical user interface, or multimedia user interface. As shown, the HMI 30 can be provided at a front side of the hand grip 26, with the trigger 28 provided on a rear side of the hand grip 26, opposite the HMI 30, and the SUI 32 can be provided on a front side of the frame 18, below the handle 16 and above the base 14, and optionally above the recovery tank 22. In other embodiments, the HMI 30 and SUI 32 can be provided elsewhere on the surface cleaning apparatus 10. One example of a suitable HMI and/or SUI is disclosed in U.S. Provisional Application No. 62/747,922, filed Oct. 19, 2018, which is incorporated herein by reference in its entirety. Either user interface 30, 32 can comprise a proximity-triggered interface, as described in the '922 application.

The HMI 30 can include one or more input controls 34, 36 in register with a printed circuit board (PCB, not shown) within the hand grip 26. In one embodiment, one input control 34 is a power input control which controls the supply of power to one or more electrical components of the apparatus 10, as explained in further detail below, one of which may be the SUI 32. Another input control 36 is a cleaning mode input control which cycles the apparatus 10 between a hard floor cleaning mode and a carpet cleaning mode, as described in further detail below. One or more of the input controls 34, 36 can comprise a button, trigger, toggle, key, switch, or the like, or any combination thereof. In one example, one or more of the input controls 34, 36 can comprise a capacitive button.

The SUI 32 can include a display 38, such as, but not limited to, an LED matrix display or a touchscreen. In one embodiment, the display 38 can include multiple status indicators which can display various detailed apparatus status information, such as, but not limited to, battery status, WiFi connection status, clean water level, dirty water level, filter status, floor type, self-cleaning, or any number of other status information. The status indicators can be a visual display, and may include any of a variety of lights, such as LEDs, textual displays, graphical displays, or any variety of known status indicators.

The SUI 32 can include at least one input control 40, which can be adjacent the display 38 or provided on the display 38. The input control 40 can comprise a self-cleaning mode input control which initiates a self-cleaning mode of operation, as described in further detail below. The input control 40 can comprise a button, trigger, toggle, key, switch, or the like, or any combination thereof. In one example, the input control 40 can comprise a capacitive button.

The surface cleaning apparatus 10 can include a controller 308 (FIG. 3) operably coupled with the various functional systems of the apparatus, including, but not limited to, the fluid delivery and recovery systems, for controlling its operation. A user of the apparatus 10 can interact with the controller 308 via one or more of the user interfaces 30, 32. The controller 308 can further be configured to execute a cleanout cycle for the self-cleaning mode of operation. The controller 308 can have software for executing the self-cleaning cycle.

Figure 2:
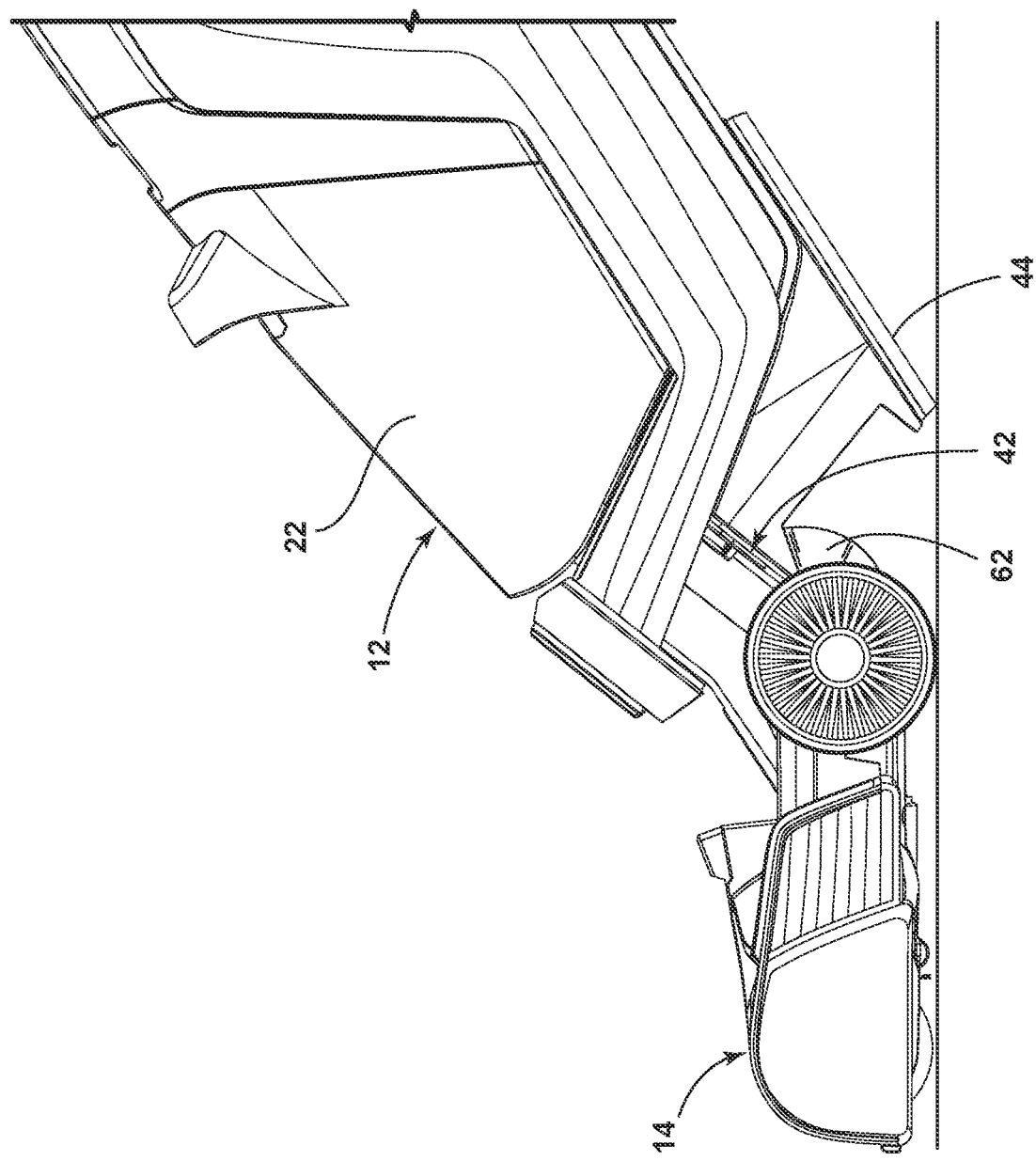
FIG. 2 is an enlarged side view of the surface cleaning apparatus from FIG. 1, showing the apparatus in a reclined position.

Referring additionally to FIG. 2, a moveable joint assembly 42 can be formed at a lower end of the frame 18 and moveably mounts the base 14 to the upright body 12. In the embodiment shown herein, the upright body 12 can pivot up and down about at least one axis relative to the base 14. The joint assembly 42 can alternatively comprise a universal joint, such that the upright body 12 can pivot about at least two axes relative to the base 14. Wiring and/or conduits can optionally supply electricity, air and/or liquid (or other fluids) between the base 14 and the upright body 12, or vice versa, and can extend though the joint assembly 42.

The upright body 12 can pivot, via the joint assembly 42, to an upright or storage position, an example of which is shown in FIG. 1, in which the upright body 12 is oriented substantially upright relative to the surface to be cleaned and in which the apparatus 10 is self-supporting, i.e. the apparatus 10 can stand upright without being supported by something else. A locking mechanism (not shown) can be provided to lock the joint assembly 42 against movement about at least one of the axes of the joint assembly 42 in the storage position, which can allows the apparatus 10 to be self-supporting. From the storage position, the upright body 12 can pivot, via the joint assembly 42, to a reclined or use position, in which the upright body 12 is pivoted rearwardly relative to the base 14 to form an acute angle with the surface to be cleaned. In this position, a user can partially support the apparatus by holding the hand grip 26. Another example of a reclined position is shown in FIG. 2, in which the upright body 12 can pivot further to at least partially rest on a floor surface.

In one embodiment, a bumper 44 is provided on a rear side of the upright body 12, for example at a lower rear side of the frame 18 and/or below the supply tank 20, to prevent scratching the floor surface when the upright body 12 is reclined. The provision of the bumper 44 can also prevent damage to the apparatus 10 or the floor surface if the apparatus 10 tips backwards when in the storage position. The bumper 44 can be made from a softer or more pliable material than the material for the frame 18 or housing of the upright body 12, i.e. a material that has a lower Young's modulus. In one example, the bumper 44 can be made from an elastomeric material, such as natural or synthetic rubber, such as ethylene propylene diene monomer (EPDM) or nitrile rubber, while the frame 18 is made from a harder and/or stiffer plastic material, such as polyvinyl chloride (PVC).

Figure 3:
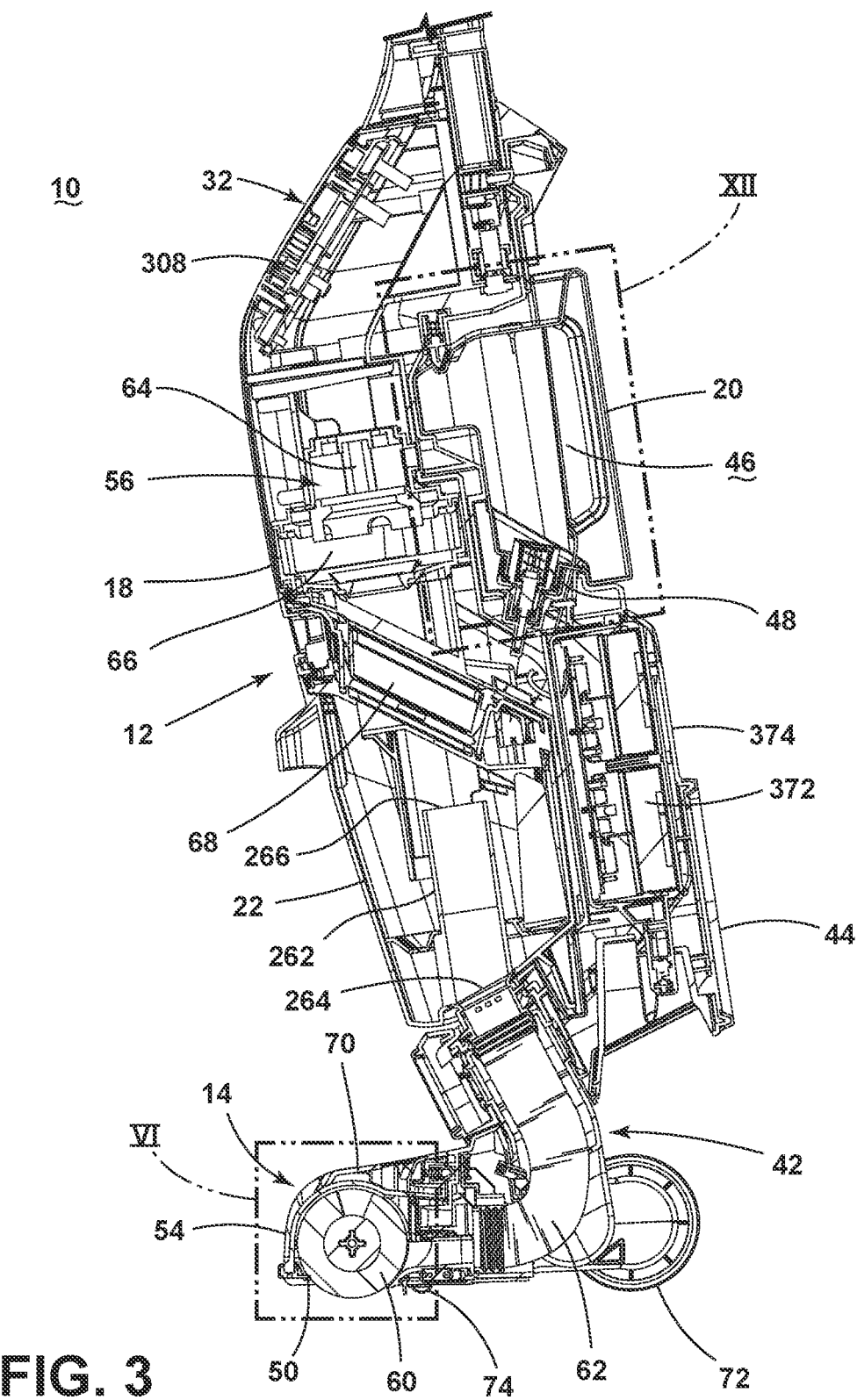
FIG. 3 is a cross-sectional view of the surface cleaning apparatus taken through line III-III of FIG. 1.

FIG. 3 is a cross-sectional view of the surface cleaning apparatus 10 through line III-III FIG. 1. The supply and recovery tanks 20, 22 can be provided on the upright body 12. The supply tank 20 can be mounted to the frame 18 in any configuration. In the present embodiment, the supply tank 20 can be removably mounted at the rear of the frame 18 such that the supply tank 20 partially rests in the upper rear portion of the frame 18 and is removable from the frame 18 for filling. The recovery tank 22 can be mounted to the frame 18 in any configuration. In the present embodiment, the recovery tank 22 can be removably mounted at the front of the frame 18, below the supply tank 20, and is removable from the frame 18 for emptying.

The fluid delivery system is configured to deliver cleaning fluid from the supply tank 20 to a surface to be cleaned, and can include, as briefly discussed above, a fluid delivery or supply pathway. The cleaning fluid can comprise one or more of any suitable cleaning fluids, including, but not limited to, water, compositions, concentrated detergent, diluted detergent, etc., and mixtures thereof. For example, the fluid can comprise a mixture of water and concentrated detergent.

The supply tank 20 includes at least one supply chamber 46 for holding cleaning fluid and a supply valve assembly 48 controlling fluid flow through an outlet of the supply chamber 46. Alternatively, supply tank 20 can include multiple supply chambers, such as one chamber containing water and another chamber containing a cleaning agent. For a removable supply tank 20, the supply valve assembly 48 can mate with a receiving assembly on the frame 18 and can be configured to automatically open when the supply tank 20 is seated on the frame 18 to release fluid to the fluid delivery pathway.

The recovery system is configured to remove spent cleaning fluid and debris from the surface to be cleaned and store the spent cleaning fluid and debris on the surface cleaning apparatus 10 for later disposal, and can include, as briefly discussed above, a recovery pathway. The recovery pathway can include at least a dirty inlet 50 and a clean air outlet 52 (FIG. 1). The pathway can be formed by, among other elements, a suction nozzle 54 defining the dirty inlet, a suction source 56 in fluid communication with the suction nozzle 54 for generating a working air stream, the recovery tank 22, and at least one exhaust vent defining the clean air outlet 52.

The suction nozzle 54 can be provided on the base 14 can be adapted to be adjacent the surface to be cleaned as the base 14 moves across a surface. A brushroll 60 can be provided adjacent to the suction nozzle 54 for agitating the surface to be cleaned so that the debris is more easily ingested into the suction nozzle 54. While a horizontally-rotating brushroll 60 is shown herein, in some embodiments, dual horizontally-rotating brushrolls, one or more vertically-rotating brushrolls, or a stationary brush can be provided on the apparatus 10.

The suction nozzle 54 is further in fluid communication with the recovery tank 22 through a conduit 62. The conduit 62 can pass through the joint assembly 42 and can be flexible to accommodate the movement of the joint assembly 42.

The suction source 56, which can be a motor/fan assembly including a vacuum motor 64 and a fan 66, is provided in fluid communication with the recovery tank 22. The suction source 56 can be positioned within a housing of the frame 18, such as above the recovery tank 22 and forwardly of the supply tank 20. The recovery system can also be provided with one or more additional filters upstream or downstream of the suction source 56. For example, in the illustrated embodiment, a pre-motor filter 68 is provided in the recovery pathway downstream of the recovery tank 22 and upstream of the suction source 56. A post-motor filter (not shown) can be provided in the recovery pathway downstream of the suction source 56 and upstream of the clean air outlet 52.

The base 14 can include a base housing 70 supporting at least some of the components of the fluid delivery system and fluid recovery system, and a pair of wheels 72 for moving the apparatus 10 over the surface to be cleaned. The wheels 72 can be provided on rearward portion of the base housing 70, rearward of components such as the brushroll 60 and suction nozzle 54. A second pair of wheels 74 can be provided on the base housing 70, forward of the first pair of wheels 72.

Figure 4:
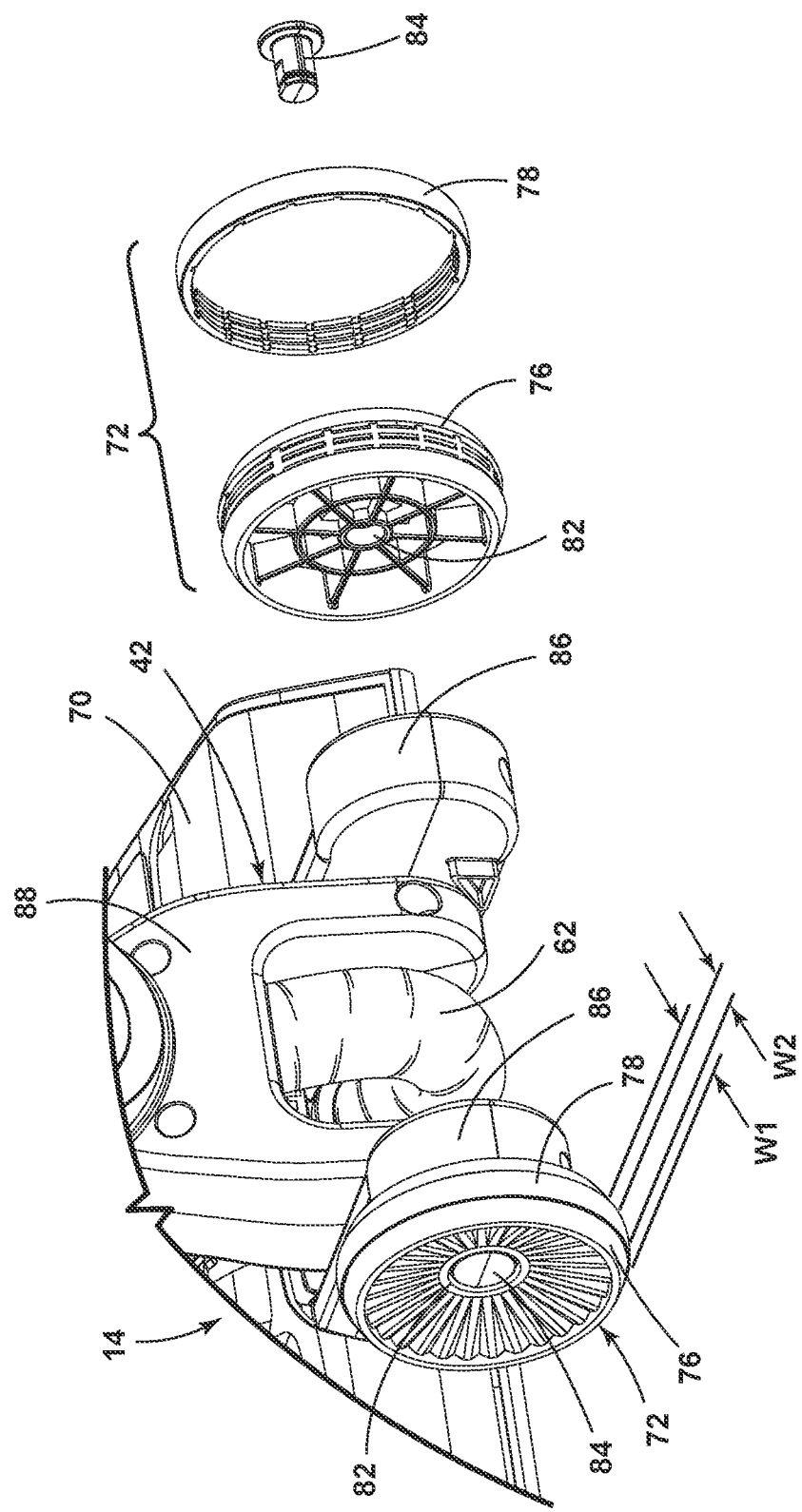
FIG. 4 is a partially exploded rear perspective view of a base of the surface cleaning apparatus, showing details of one embodiment of a wheel for the base.

FIG. 4 is a partially exploded rear perspective view of the base 14. In one embodiment, the wheels 72, or rear wheels, can comprise an outer edge or rim 76 which holds a tread 78. The rim 76 has a width W1 and the tread 78 has a width W2, as shown in FIG. 4. The tread 78 can be narrower than the rim 76, i.e. W2<W1, to reduce the contact width of the wheel 72 on the surface to be cleaned. The contact width of the wheel 72 can therefore be ≤W2. For example, a substantially flat tread 78 can provide a contact width substantially equal to the width of tread, i.e. substantially equal to W2, while a tread 78 with a curved or angled shape can provide a contact width somewhat less than the width of tread 78, i.e. <W2. The narrow tread 78 therefore reduces the occurrence and appearance of streaks on a cleaned floor surface which are caused by the wheels 72 rolling on the wet floor surface. Optionally, the tread 78 can be overmolded onto a crown 80 of the rim 76.

The wheels 72 can further include a hub 82 connected with the rim 76 and which receives an axle 84 on which the wheel 72 rotates. The axles 84 can be coupled with the base housing 70, and can further be coupled with rear housing extensions 86 of the base housing 70, to which a yoke 88 of the joint assembly 42 couples to pivot up and down relative to the base 14. The axles 84 can couple to an outer side of the housing extensions 86, while the yoke 88 couples to an inner side of the housing extensions 86. Optionally, the flexible conduit 62 can pass between the housing extensions 86 can up through the yoke 88.

Figure 5:
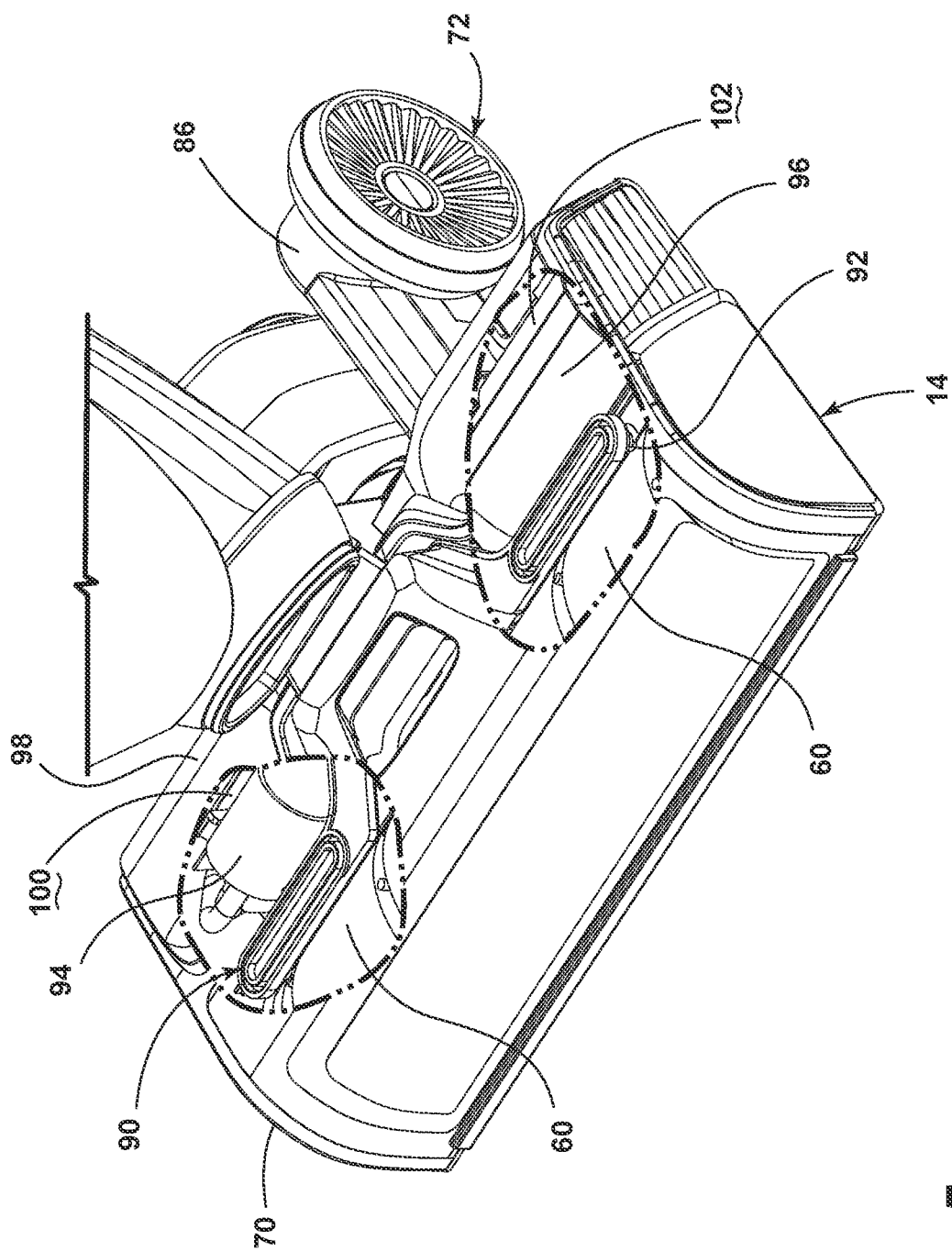
FIG. 5 is a front perspective view of the base, with portion of the base partially cut away to show internal details of the base.

FIG. 5 is a front perspective view of the base 14, with portion of the base 14 partially cut away to show some internal details of the base 14. In addition to the supply tank 20 (FIG. 3), the fluid delivery pathway can include a fluid distributor 90 having at least one outlet for applying the cleaning fluid to the surface to be cleaned. In one embodiment, the fluid distributor 90 can be one or more spray tips 92 on the base 14 configured to deliver cleaning fluid to the surface to be cleaned directly or indirectly by spraying the brushroll 60. Other embodiments of fluid distributors 90 are possible, such as a spray manifold having multiple outlets or a spray nozzle configured to spray cleaning fluid outwardly from the base 14 in front of the surface cleaning apparatus 10.

The fluid delivery system can further comprise a flow control system for controlling the flow of fluid from the supply tank 20 to the fluid distributor 90. In one configuration, the flow control system can comprise a pump 94 which pressurizes the system. The trigger 28 (FIG. 1) can be operably coupled with the flow control system such that pressing the trigger 28 will deliver fluid from the fluid distributor 90. The pump 94 can be positioned within a housing of the base 14, and is in fluid communication with the supply tank 20 via the valve assembly 48. Optionally, a fluid supply conduit can pass interiorly to joint assembly 42 and fluidly connect the supply tank 20 to the pump 94. In one example, the pump 94 can be a centrifugal pump. In another example, the pump 94 can be a solenoid pump having a single, dual, or variable speed.

In another configuration of the fluid supply pathway, the pump 94 can be eliminated and the flow control system can comprise a gravity-feed system having a valve fluidly coupled with an outlet of the supply tank 20, whereby when valve is open, fluid will flow under the force of gravity to the fluid distributor 90.

Optionally, a heater (not shown) can be provided for heating the cleaning fluid prior to delivering the cleaning fluid to the surface to be cleaned. In one example, an in-line heater can be located downstream of the supply tank 20, and upstream or downstream of the pump 94. Other types of heaters can also be used. In yet another example, the cleaning fluid can be heated using exhaust air from a motor-cooling pathway for the suction source 56 of the recovery system.

The brushroll 60 can be operably coupled to and driven by a drive assembly including a dedicated brushroll motor or brush motor 96 in the base 14. The coupling between the brushroll 60 and the brush motor 96 can comprise one or more belts, gears, shafts, pulleys or combinations thereof. Alternatively, the vacuum motor 64 (FIG. 3) can provide both vacuum suction and brushroll rotation.

In the illustrated embodiment, the base housing 70 comprises a rear housing 98 which contains the pump 94 and the brush motor 96. The flexible conduit 62 can pass between the pump 94 and the brush motor 96, and can generally bisect the rear housing 98 into a pump cavity 100 and a brush motor cavity 102. The rear housing extensions 86 can extend rearwardly from the rear housing 98. A wiring conduit (not shown) can provide a passthrough for electrical wiring from the upright body 12 to the base 14 through joint assembly 42. For example, the wiring can be used to supply electrical power to the pump 94 and brush motor 96.

Figure 6:
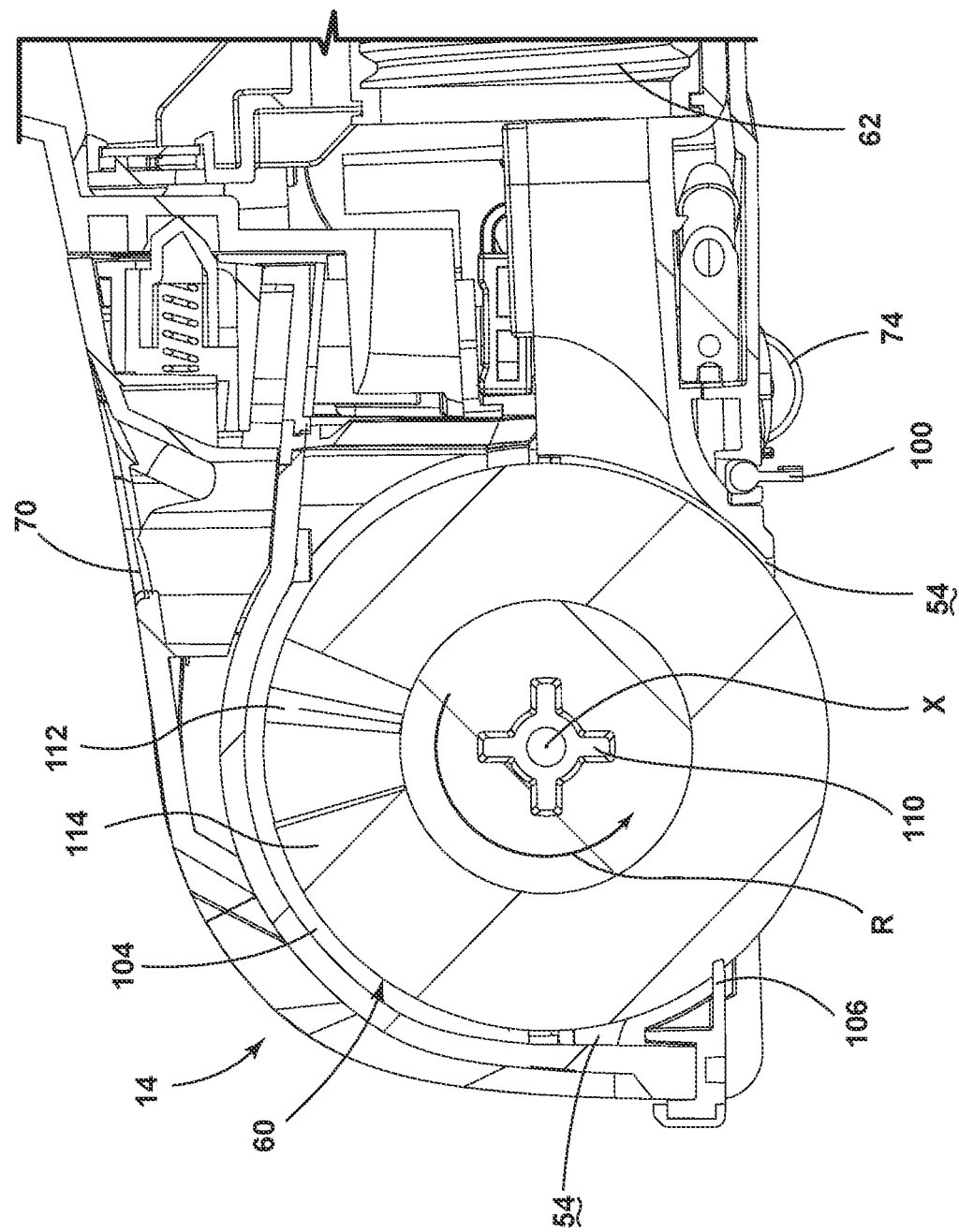
FIG. 6 is an enlarged view of section VI of FIG. 3, showing a forward section of the base including details of a brushroll, brush chamber, and a rigid interference wiper.

FIG. 6 is an enlarged view of section VI of FIG. 3, showing a forward section of the base 14. The brushroll 60 can be provided at a forward portion of the base 14 and received in a brush chamber 104 on the base 14. The brushroll 60 is positioned for rotational movement in a direction R about a central rotational axis X. The brush chamber 104 can be forward of the rear housing 98, and can be defined at least in part by the suction nozzle 54, as described in more detail below. In the present embodiment the suction nozzle 54 is configured to extract fluid and debris from the brushroll 60 and from the surface to be cleaned.

An interference wiper 106 is mounted at a forward portion of the brush chamber 104 and is configured to interface with a leading portion of the brushroll 60, as defined by the direction of rotation R of the brushroll 60. The interference wiper 106 is below the fluid distributor 90, such that the wetted portion brushroll 60 rotates past the interference wiper 106, which scrapes excess fluid off the brushroll 60, before reaching the surface to be cleaned. Optionally, the interference wiper 106 can be disposed generally parallel to the surface to be cleaned.

The wiper 106 can be rigid, i.e. stiff and non-flexible, so the wiper 106 does not yield or flex by engagement with the brushroll 60. Optionally, the wiper 106 can be formed of rigid thermoplastic material, such as poly (methyl methacrylate) (PMMA), polycarbonate, or acrylonitrile butadiene styrene (ABS).

A squeegee 108 is mounted to the base housing 70 behind the brushroll 60 and the brush chamber 104 and is configured to contact the surface as the base 14 moves across the surface to be cleaned. The squeegee 108 wipes residual fluid from the surface to be cleaned so that it can be drawn into the recovery pathway via the suction nozzle 54, thereby leaving a moisture and streak-free finish on the surface to be cleaned. Optionally, the squeegee 108 can be disposed generally orthogonal to the surface to be cleaned, or vertically. The squeegee 108 can be smooth as shown, or optionally comprise nubs on the end thereof.

The squeegee 108 can be pliant, i.e. flexible or resilient, in order to bend readily according to the contour of the surface to be cleaned yet remain undeformed by normal use of the apparatus 10. Optionally, the squeegee 108 can be formed of a resilient polymeric material, such as ethylene propylene diene monomer (EPDM) rubber, polyvinyl chloride (PVC), a rubber copolymer such as nitrile butadiene rubber, or any material known in the art of sufficient rigidity to remain substantially undeformed during normal use of the apparatus 10.

In the present example, brushroll 60 can be a hybrid brushroll suitable for use on both hard and soft surfaces, and for wet or dry vacuum cleaning. In one embodiment, the brushroll 60 comprises a dowel 110, a plurality of bristles 112 extending from the dowel 110, and microfiber material 114 provided on the dowel 110 and arranged between the bristles 112. One example of a suitable hybrid brushroll is disclosed in U.S. Pat. No. 10,092,155, incorporated above. The bristles 112 can be arranged in a plurality of tufts or in a unitary strip. Dowel 110 can be constructed of a polymeric material such as acrylonitrile butadiene styrene (ABS), polypropylene or styrene, or any other suitable material such as plastic, wood, or metal. Bristles 112 can be tufted or unitary bristle strips and constructed of nylon, or any other suitable synthetic or natural fiber. The microfiber material 114 can be constructed of polyester, polyamides, or a conjugation of materials including polypropylene or any other suitable material known in the art from which to construct microfiber.

Figure 7:
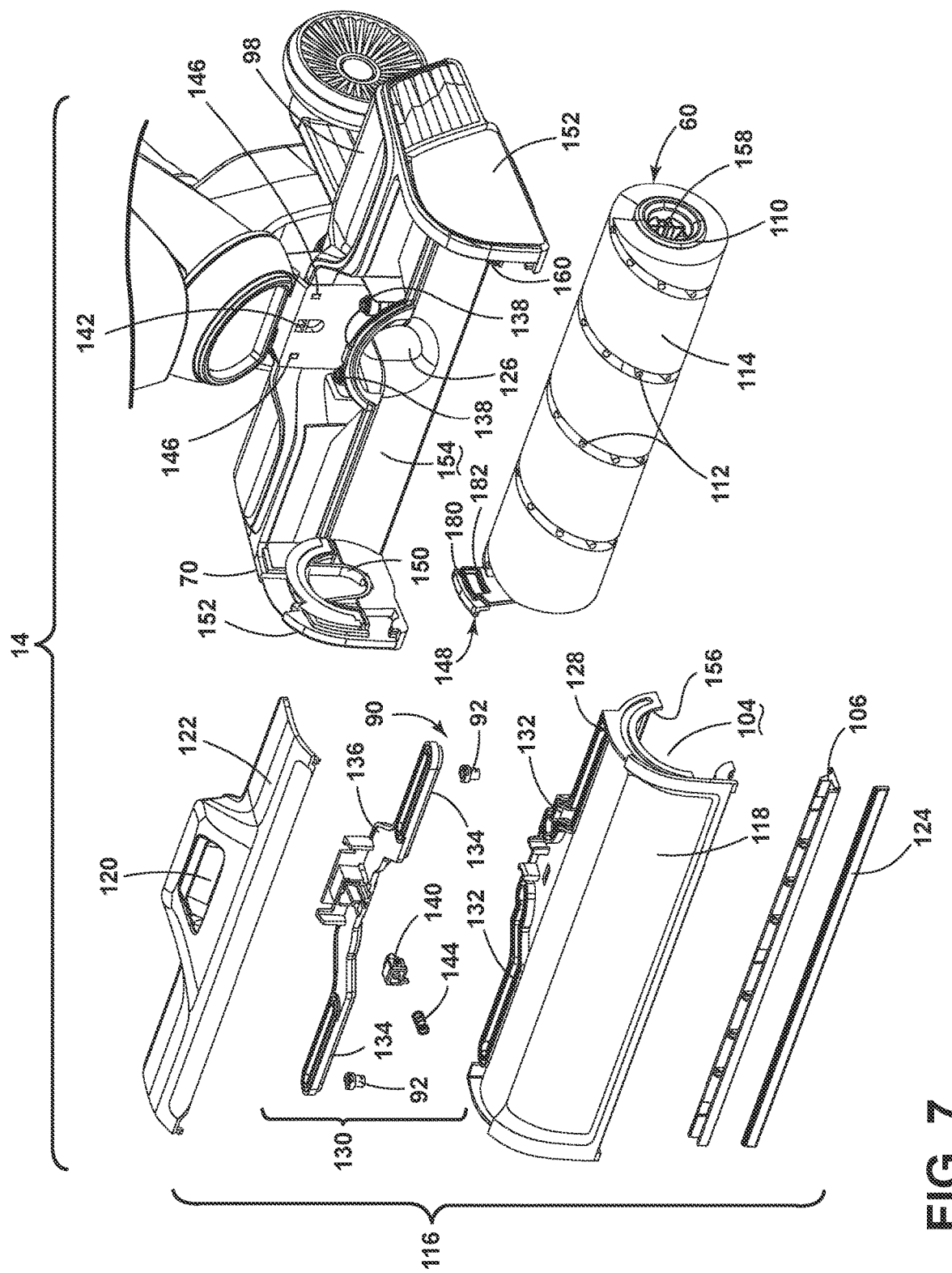
FIG. 7 is a partially exploded front perspective view of the base of the surface cleaning apparatus, showing details of one embodiment of a removable nozzle assembly.

FIG. 7 is a partially exploded, perspective view of the base 14. In one embodiment, the base 14 can comprise a removable nozzle assembly 116 coupled to the base housing 70 and defining at least the suction nozzle 54. In one embodiment, the nozzle assembly 116 can comprise a nozzle housing 118. The nozzle housing 118 can define the brush chamber 104 which partially encloses the brushroll 60. Optionally, the wiper 106 is mounted at an interior forward side of the nozzle housing 118, and projects into the brush chamber 104.

The nozzle assembly 116 can comprise a hand grip 120 on the nozzle housing 118 which can be used to lift the nozzle assembly 116 away from the base housing 70. The nozzle assembly 116 can comprise a cover 122 on which the hand grip 120 is provided, or the hand grip 120 can be provided directly on the nozzle housing 118. The nozzle housing 118 and/or cover 122 can be formed from a translucent or transparent material, such that the brushroll 60 is at least partially visible to a user through the suction nozzle assembly 116. A bumper 124 can be provided on the nozzle assembly 116, such as at a lower front edge of the nozzle housing 118. A base conduit 126 of the recovery pathway can be provided in the base housing 70 and can couple the nozzle housing 118, particularly the suction nozzle 54 and brush chamber 104 defined by the nozzle housing 118, with the flexible conduit 62.

The fluid distributor 90 can optionally be integrated with the removable nozzle assembly 116. The nozzle housing 118 can include at least one outlet opening 128 in register with the fluid distributor 90 for delivering fluid to the surface to be cleaned, including to the brushroll 60 or directly to the surface to be cleaned.

In one embodiment, the nozzle assembly 116 can define a pair of fluid delivery channels 130 that are each fluidly connected to one of the spray tips 92 at a terminal end thereof. Each spray tip 92 can include at least one outlet to deliver fluid to the surface to be cleaned, and can be in fluid communication with the brush chamber 104 to delivery fluid directly to the brushroll 60, or directly to the surface to be cleaned. The spray tips 92 can optionally be oriented to spray fluid inwardly onto the brushroll 60.

The fluid delivery channels 130 can be defined by lower channel halves 132 and upper channel halves 134, which can be provided on mating components of the nozzle assembly 116. In the embodiment shown, the lower channel halves 132 are provided on the nozzle housing 118 and the upper channel halves 134 are provided on a channel housing 136 which mates with the nozzle housing 118, optionally beneath the cover 122.

A fluid coupling can be provided between the nozzle assembly 116 and the base housing 70 in order to fluidly connect the pump 94 (FIG. 5) with the fluid delivery channels 130 when the nozzle assembly 116 is seated on the base housing 70. In the illustrated embodiment, spray connectors 138 are provided on the base housing 70 and can comprise valves that are normally closed when the nozzle assembly 116 is removed from the base housing 70. Installing the nozzle assembly 116 on the base housing 70 can automatically open the spray connectors 138 and permit fluid to flow into the delivery channels 130. Optionally, a fluid supply conduit (not shown) can fluidly connect the pump 94 to the spray connectors 138.

A nozzle latch 140 can be provided to releasably secure the nozzle assembly 116 on the base housing 70. The nozzle latch 140 can be received in a latch receiver 142 provided on the base housing 70, and be biased by a spring 144 to a latched position. The nozzle latch 140 can be configured to releasably latch or retain, but not lock, the nozzle assembly 116 to the base housing 70, such that a user can conveniently apply sufficient force to the nozzle assembly 116 itself, such as via the hand grip 120, to pull the nozzle assembly 116 off the base housing 70. Optionally the latch 140 can be carried by the channel housing 136.

The base 14 can have at least one indicator light 146 configured to activate in combination with the pump 94 (FIG. 5) when trigger 28 (FIG. 1) is depressed to deliver fluid. In the illustrated embodiment, the indicator light 146 includes at least one light emitting diode (LED) or other illumination source provided on the base housing 70, and more particularly provided on the rear housing 98. The indicator light 146 can be positioned behind the nozzle cover 122, which can be formed from a translucent or transparent material, such that the illumination from the indicator light 146 is at least partially visible to a user from the exterior of the base 14. Electrical wiring for the indicator light 146 can be passed through the joint assembly 42 from the upright body 12 to the base 14 through joint assembly 42.

Optionally, the brushroll 60 can be configured to be removed by the user from the base 14, such as for cleaning and/or drying the brushroll 60. The brushroll 60 can be removably mounted in the brush chamber 104 by a brushroll latch 148 which is coupled with the brushroll 60. Accordingly, the nozzle assembly 116 may be removed from the base housing 70 prior to removing the brushroll 60. In other embodiments, the brushroll 60 and latch 148 can be configured such that prior removal of the nozzle assembly 116 is not required.

The brushroll latch 148 can be received by a mating component 150 on the base housing 70. In one embodiment, the base housing 70 can include spaced lateral sidewalls 152 which define a cavity 154 therebetween. The mating component 150 can be provided on an inner surface of one of the lateral sidewalls 152. The lateral sidewalls 152 can extend forwardly from the rear housing 98. Optionally, the lateral sidewalls 152 can form a portion of the brush chamber 104, such as by enclosing open lateral ends 156 of the nozzle housing 118.

The latch 148 can be provided on one end of the dowel 110 of the brushroll 60. The opposite end of the dowel 110 can have a splined drive connection 158 with a drive head 160 of a transmission operably connecting the brush motor 96 (FIG. 5) to the brushroll 60. The drive head 160 can be provided at the lateral sidewall 152 opposite the mating component 150.

Figure 9:
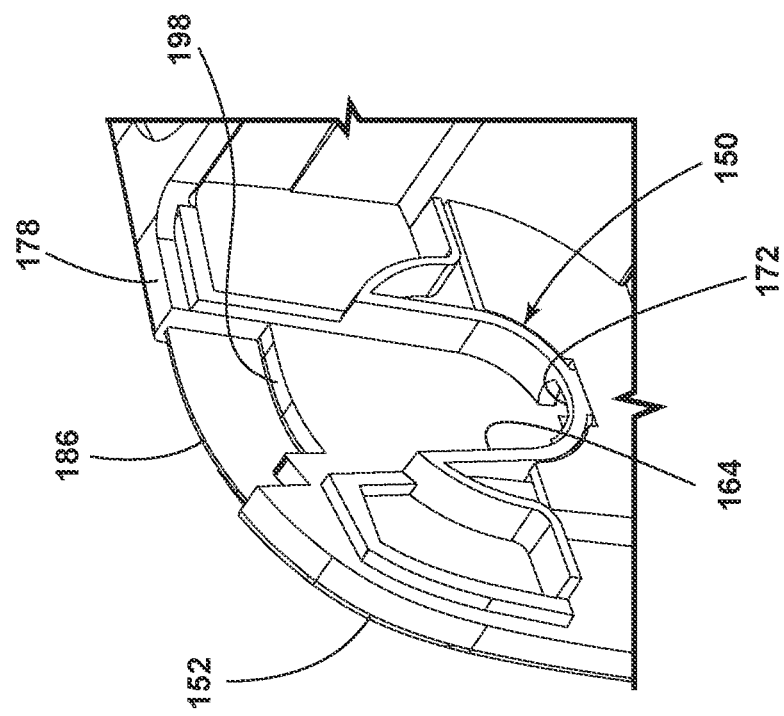
FIG. 9 is an enlarged view of a portion of the base, showing details of one embodiment of a mating component for the brushroll latch of FIG. 8.
Figure 8:
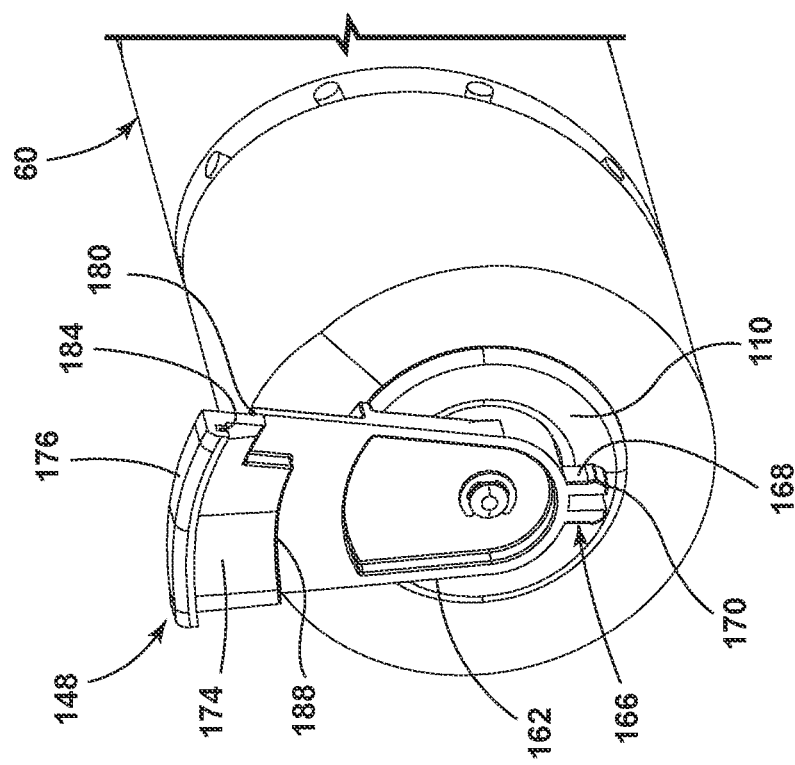
FIG. 8 is an enlarged view of one end of the brushroll, showing details of one embodiment of a latch for the brushroll for the apparatus.

With additional reference to FIGS. 8-9, the brushroll latch 148 can have a latch body 162 that is received by a latch body receiver 164 of the mating component 150. The latch body 162 can be complementary to or keyed with the receiver 164 to ensure proper installation of the brushroll 60. In the illustrated embodiment, the latch body 162 and the receiver 164 can have complementary U-shapes and can optionally taper in the insertion direction of the brushroll 60, i.e. downwardly.

The brushroll latch 148 can comprise a protruding part 166 which is snap fit with the mating component 150 on the base housing 70. In one embodiment, the protruding part 166 include at least one, and optionally two, cantilever part 168 having a hook, stud, lug, bead, or other engagement element 170 at an end thereof. The protruding part 166 is deflected briefly during the joining operation and catches in a depression or undercut 172 in the mating component 150, optionally in the latch body receiver 164. The depression or undercut 172 is shaped to allow separation of the brushroll 60 and from the base housing 70.

The brushroll latch 148 can form part of an outer perimeter of the base housing 70, which can improve edge cleaning by enabling the end of the brushroll 60 to extend closer to the lateral edge of the base 14. For example, a portion of the brushroll latch 148 can form a portion of the lateral sidewall 152 of the housing 70 when the brushroll 60 is installed. When assembled, the brushroll latch 148 can form an exterior surface of the base 14. Using the brushroll latch 148 to form a portion of the base housing 70, rather than having the brushroll latch 148 abut up against an outer wall of the base housing 70, eliminates bulk without sacrificing housing strength, allowing the brushroll 60 to be closer to the lateral edge of the base 14.

The brushroll latch 148 can include a release tab 174, which can be coupled with the latch body 162, and which a user can grip to remove the brushroll 60. The release tab 174 can form a portion of one of the lateral sidewalls 152 of the base housing 70, which can improve edge cleaning by enabling the end of the brushroll 60 to extend closer to the lateral edge of the base 14. In the illustrated embodiment, the release tab has a top edge or surface 176 that is continuous with a top edge or surface 178 on the lateral sidewall 152 when the brushroll 60 is installed on the base housing 70. When assembled, the top edge or surface 176, and optionally only the top edge or surface 176, of the release tab 174 is visible, and can form an exterior surface of the base 14.

The release tab 174 can be captured by the removable nozzle assembly 116 upon installation of the brushroll 60 on the base housing 70, which can prevent unintended release of the brushroll 60. Optionally, a portion of the nozzle assembly 116 can overlie a tab or shoulder 180 on the latch 148 to prevent upward movement of latch 148, and therefore the brushroll 60, when the nozzle assembly 116 is installed. In the embodiment shown, the nozzle cover 122 overlies the shoulder 180.

The release tab 174 can optionally include a gripping feature 182 to assist in lifting the brushroll 60. The gripping feature 182 can be hidden by the nozzle assembly 116 when installed on the base housing 70 and revealed upon removal of the nozzle assembly 116 from the base housing 70. The gripping feature 182 can be provided a portion of the latch 148 extending above the brushroll 60.

The latch 148 and lateral sidewall 152 can include one or more additional mating surfaces or joints which help distribute the weight of the brushroll 60 supported by the lateral sidewall 152. In the illustrated embodiment, the latch 148 includes a slot 184 on a lower side of the top surface 176 that receives a thin ridge 186 on the lateral sidewall 152; the slot 184 and ridge 186 together form a tongue and groove joint between the latch 148 and the lateral sidewall 152. Alternatively or additionally, the latch 148 can include a tab or shoulder 188 which rests on a ledge 190 of the mating component 150.

Figure 10:
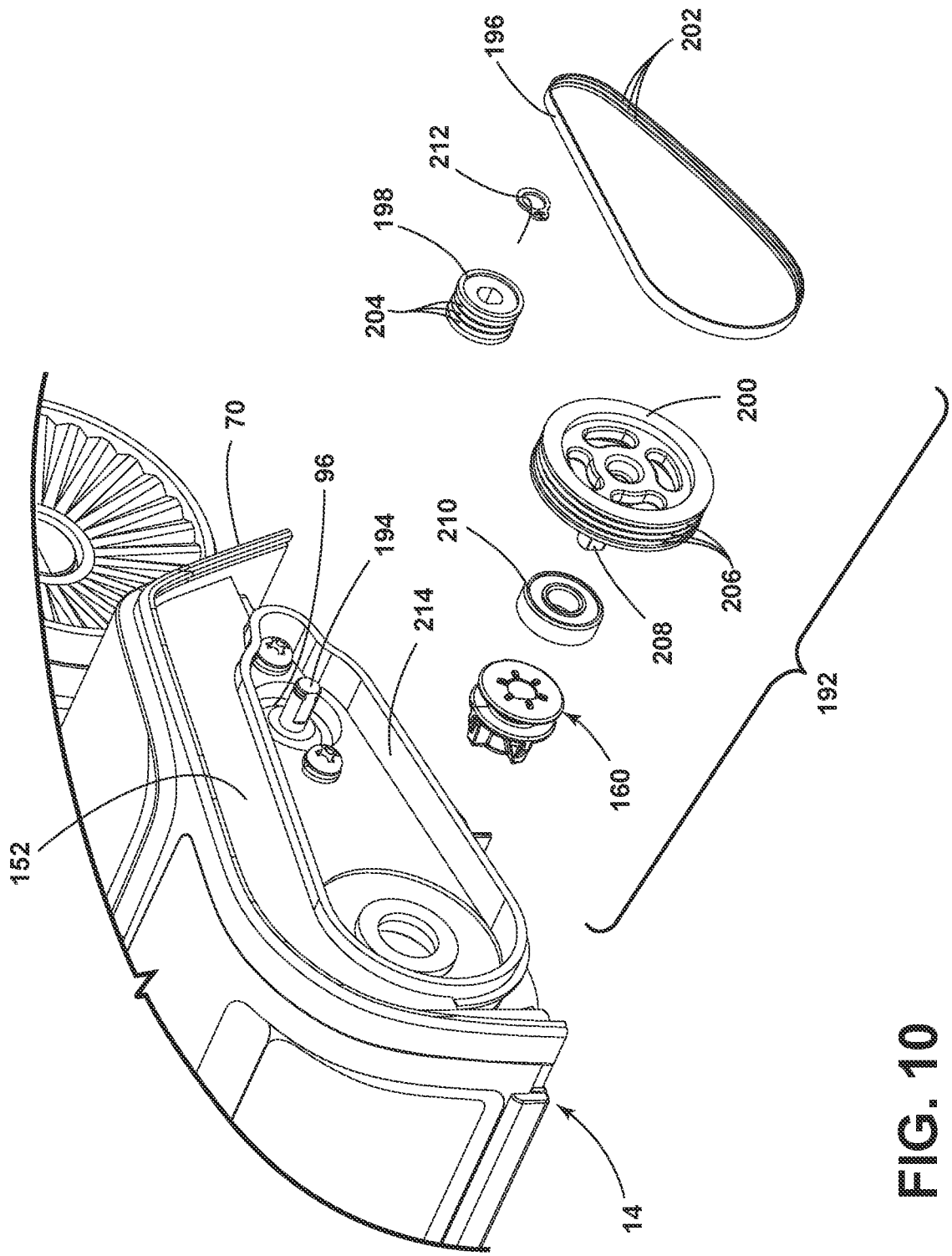
FIG. 10 is a partially-exploded perspective view of the base, showing one embodiment of a drive transmission operably connecting the brushroll to a brush motor, and in which a portion of the base has been removed in order to better show the transmission.

Referring to FIG. 10, an example of a transmission 192 for the brushroll 60 (FIG. 7) is shown. The transmission 192 connects the brush motor 96 to the brushroll 60 for transmitting rotational motion of a motor shaft 194 of the brush motor 96 to the brushroll 60. The transmission 192 can include a V-belt 196 (or vee belt) and one or more gears, shafts, pulleys, or combinations thereof. The V-belt 196 is narrower than other types of belts conventionally used for surface cleaning apparatus, such as flat belts or cog belts, which can increase available space within the base 14 and improve edge cleaning by enabling the end of the brushroll 60 to extend closer to the lateral edge of the base 14, for example closer to the lateral sidewall 152 on the transmission side. As an additional benefit, the V-belt 196 is quieter than other belts conventionally used for surface cleaning apparatus and reduces operational noise of the apparatus.

In addition to the V-belt 196, the transmission 192 can, for example, include a pulley 198 coupled with the motor shaft 194 and a pulley 200 coupled with brushroll 60, with the V-belt 196 coupling the motor pulley 198 with the brushroll pulley 200. The V-belt 196 can be a multi-groove or polygroove belt with multiple "V" shape ribs 202 alongside each other, which track in mating grooves 204, 206 in the motor and brushroll pulleys 198, 200, respectively. Because the V-belt 196 tends to wedge into the mating grooves 204, 206, sufficient torque transmission can be provided with less belt width and tension, for example as compared to a flat belt.

The transmission 192 can further include the drive head 160 keyed to or otherwise fixed with the brush pulley 200 by an axle 208. A bearing 210 may also be carried on the axle 208. The brushroll pulley 200 can be keyed to or otherwise fixed with the motor shaft 194, and secured thereon by a retaining ring 212.

It is noted that in FIG. 10, a portion of the base housing 70 has been removed in order to view the transmission 192 and an optional drive housing 214 for the transmission 192. The drive housing 214 can be formed with or otherwise coupled to the lateral sidewall 152 on the transmission side.

Figure 11:
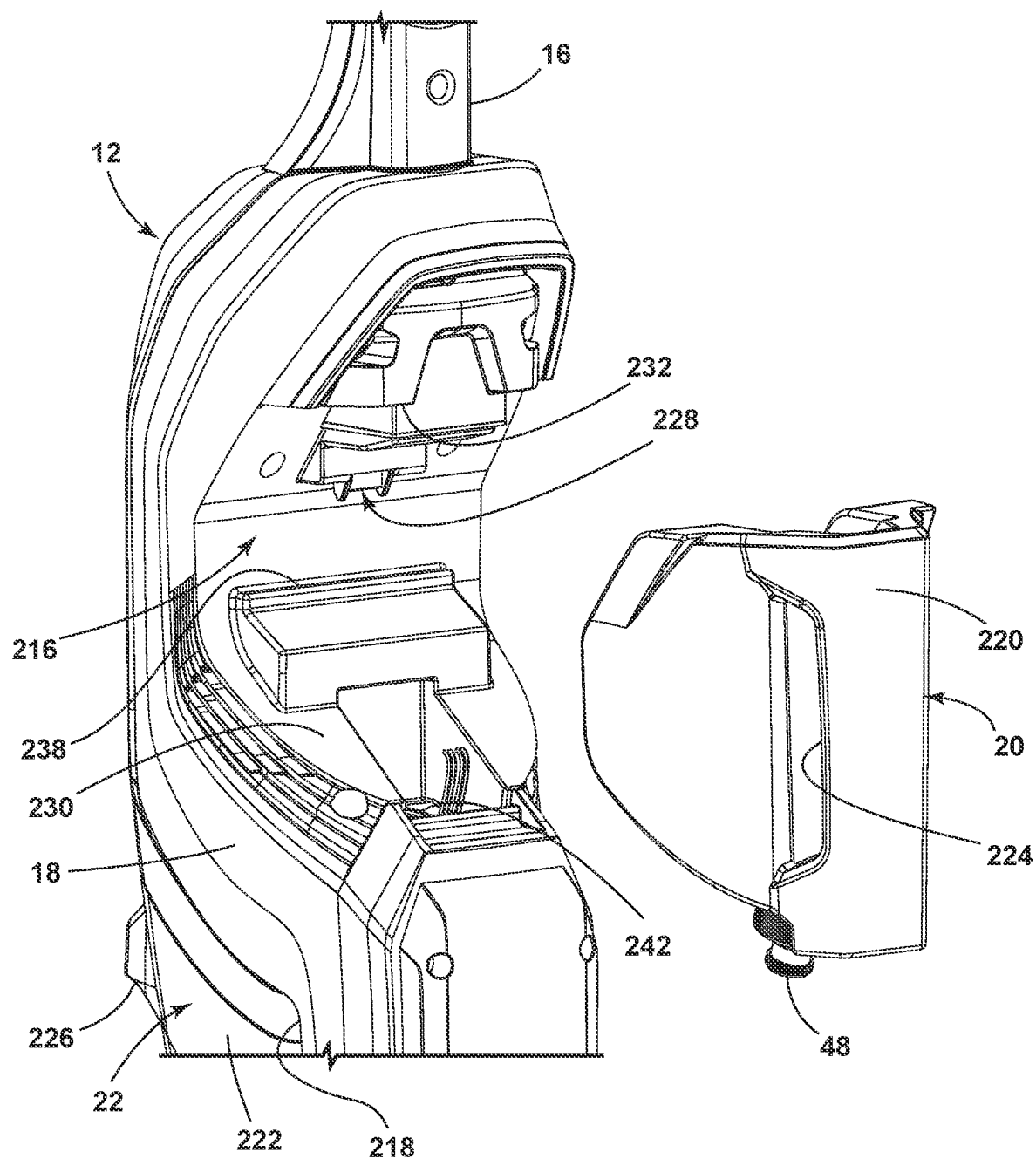
FIG. 11 is a partially-exploded rear perspective view of the surface cleaning apparatus, showing one embodiment of a supply tank, receiver, and supply tank latch for the surface cleaning apparatus.

Referring to FIG. 11, the upright body 12 comprises tank sockets or receivers 216, 218 for respectively receiving the supply and recovery tanks 20, 22. As shown herein, in one embodiment the tank receivers 216, 218 can be defined by portions of the frame 18, and can be provided on opposing sides of the frame 18, and more particularly on rear and front sides of the frame 18, respectively. The supply and recovery tanks 20, 22 can include externally-facing surfaces 220, 222, which form external surfaces of the apparatus 10 when the tank 20, 22 are seated in the receivers 216, 218. Optionally, the tank 20, 22 can have hand grips 224, 226 provided on the externally-facing surfaces 220, 222. As shown herein, the supply tank hand grip 224 comprises hand grip indentations formed in its externally-facing surface 220, and the recovery tank hand grip 226 comprises a handle projecting from its externally-facing surface 222, although other configurations are possible for each.

Figure 12:
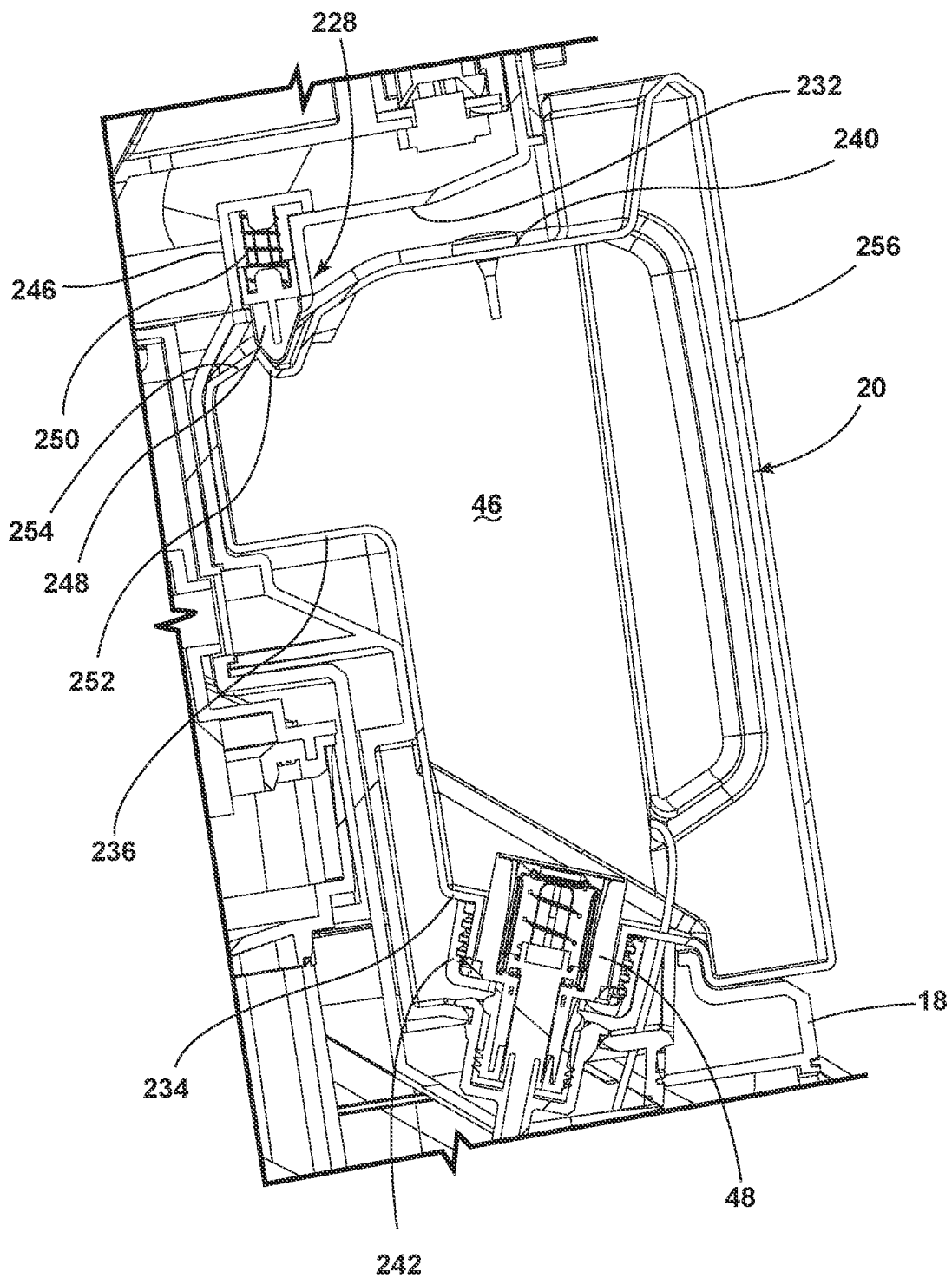
FIG. 12 is an enlarged view of section XII of FIG. 3, showing the supply tank and supply tank latch of FIG. 11.

Referring to FIGS. 11-12, the supply tank receiver 216 include a latch 228 for securing the supply tank 20 to the upright body 12. The latch 228 facilitates correct installation and better sealing of the supply tank 20, which alleviates user error and misassembly. The latch 228 can be configured to releasably latch or retain, but not lock, the supply tank 20 to the upright body 12, such that a user can conveniently apply sufficient force to the supply tank 20 itself to pull the supply tank 20 off the frame 18. In one embodiment, the latch 228 for the supply tank 20 can comprise a biased latch configured to release the supply tank 20 upon application a sufficient force to overcome the biased latching force of the latch 228. More specifically, the latch 228 can comprise a spring-biased latch. One example of a suitable latch is disclosed in U.S. Provisional Application No. 62/638,477, filed Mar. 5, 2018, which is incorporated herein by reference in its entirety.

In the embodiment illustrated herein, the supply tank receiver 216 can include a support wall 230 and an overhanging wall 232 provided on the frame 18, below the handle 16. The overhanging wall 232 can extend outwardly to overhang at least a portion of the support wall 230. The lower end of the supply tank 20 can comprise one or more internally-facing surfaces 234 adapted to rest on the support wall 230 of the receiver 216. Optionally, the supply tank 20 can include an indent 236 in a sidewall thereof which rests on a platform 238 of the support wall 230. The upper end of supply tank 20 can comprise one or more internally-facing surfaces 240 adapted to confront the overhanging wall 232 when the supply tank 20 is installed on the frame 18. Optionally, the supply tank receiver 216 can have substantially open sides.

The latch 228 can be provided on the frame 18 of the upright body 12. More specifically, as shown in the embodiment illustrated herein, the latch 228 can be provided on the overhanging wall 232 of the supply tank receiver 216. When the supply tank 20 is seated within the supply tank receiver 216, the supply tank 20 rests on the support wall 230 and is retained in place by the latch 228 on the overhanging wall 232. Alternatively, the latch 228 can be provided elsewhere on the receiver 216.

A valve seat 242 can be formed in the supply tank receiver 216, such as in the support wall 230, for receiving the supply valve assembly 48 controlling fluid flow through an outlet of the supply chamber 46 when the supply tank 20 is seated within the supply tank receiver 216. The supply valve assembly 48 can be adapted to open upon the seating of the supply tank 20 within the supply tank receiver 216, and to close upon removal of the supply tank 20 from the supply tank receiver 216.

In the embodiment illustrated herein, the frame 18 includes a pocket 246 formed therein for mounting the latch 228. More particularly, the pocket 246 can be provided in the overhanging wall 232 of the receiver 216.

The latch 228 can include a latch member 248 and a biasing member 250 configured to bias the latch member 248 outwardly from the pocket 246. In one embodiment, the latch member 248 can comprise a spring-biased latch and the biasing member 250 can specifically comprise a spring, such as a coil spring. As shown herein, the spring 250 can be retained between the latch member 248 and the pocket 246. The latch member 248 is moveable relative to the pocket 246 and is constrained by the pocket 246 for axial movement along a latch axis, which can be substantially parallel to the longitudinal axis of the upright body 12 or handle 16.

The supply tank 20 includes a catch 252 for the latch 228. The catch 252 is configured to be retained by the latch 228 to releasably hold the supply tank 20 in the receiver 216. As shown herein, the catch 252 can be formed on one of the internally-facing surfaces of the supply tank 20 such that the catch 252 and latch 228 are hidden when the supply tank 20 is seated in the receiver 216. More specifically, the catch 252 can be formed on the upper internally-facing surface 240 of the supply tank 20, which confronts the overhanging wall 232. The supply tank 20 can be shaped to facilitate movement of the latch 228 during installation, such as having an angled lead-in portion 254 on the upper internally-facing surface 240. In an embodiment where the supply tank 20 comprise a blow-molded tank body 256, the catch 252 can be formed integrally in an upper portion of the blow-molded tank body 256 forming the upper end of the tank 20.

The supply tank 20 can be installed on the frame 18 in accordance with the following method. The bottom of the supply tank 20 is inserted into the receiver 216, with the supply valve assembly 48 in register with the valve seat 242, and the upper portion of the supply tank 20 is rotated toward the receiver 216 to seat the supply tank 20. During installation, the angled lead-in portion 254 of the supply tank 20 rides under the latch 228 and causes the latch member 248 to compress the spring 250, and retract into the pocket 246. When the supply tank 20 is seated, the latch member 248 clears the angled lead-in portion 254 of the supply tank 20 and the spring 250 forces the latch member 248 to extend out of the pocket 246 and into the latched position shown in FIG. 12.

To remove the supply tank 20, the user can conveniently apply sufficient force to the supply tank 20 itself, such as by gripping the hand grips 224, to pull the supply tank 20 off the frame 18. Upon application a sufficient force via engagement of the catch 252 with the latch member 248 to overcome the biasing force of the spring 250, the latch member 248 is forced deeper into the pocket 246 and clears the catch 252, thereby releasing the supply tank 20 to be lifted away from the frame 18.

Figure 14:
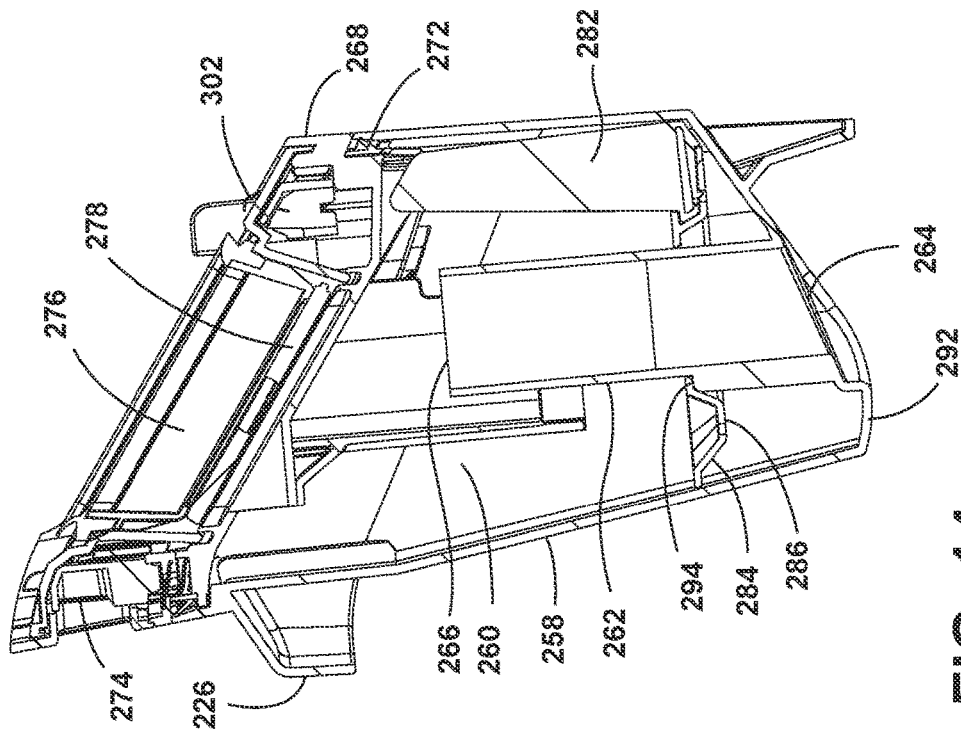
FIG. 14 is a cross-sectional view through the recovery tank of FIG. 13.
Figure 13:
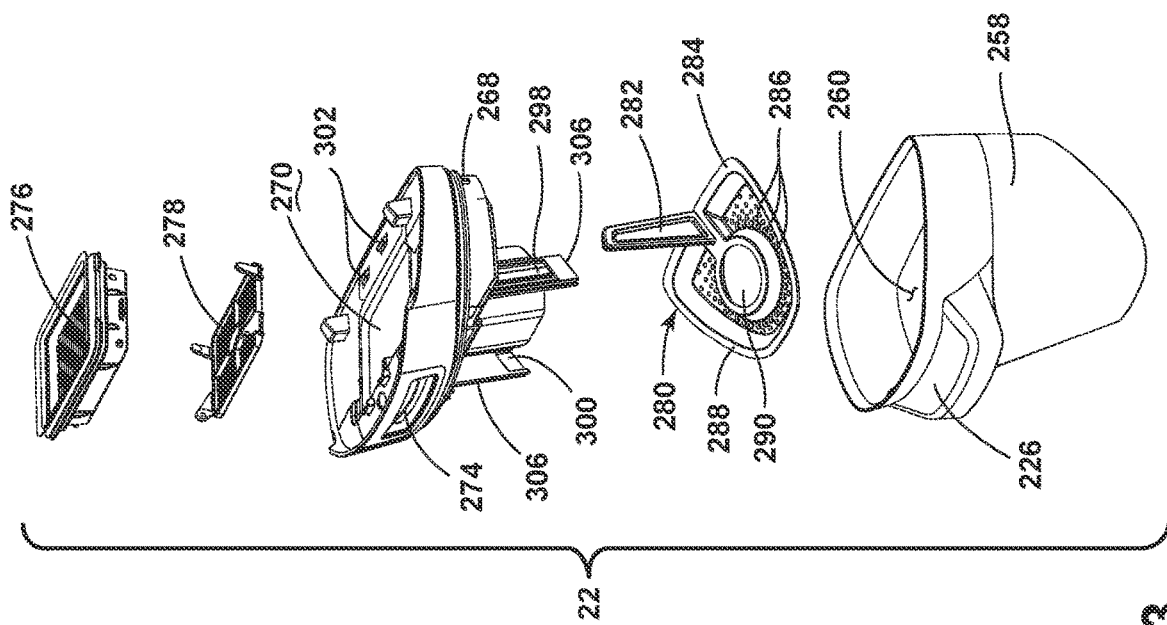
FIG. 13 is an exploded view of one embodiment of a recovery tank for the surface cleaning apparatus.

FIG. 13 is a partially exploded perspective view of one embodiment of the recovery tank 22 and FIG. 14 is a cross-sectional view of the recovery tank 22. The recovery tank 22 can include a recovery tank container 258, which forms a collection chamber 260 for the fluid recovery system, with a hollow standpipe 262 therein. The standpipe 262 can be oriented such that it is generally coincident with a longitudinal axis of the tank container 258. The standpipe 262 forms a flow path between a tank inlet 264 formed at a lower end of the tank container 258 and a tank outlet 266 at the upper end of the standpipe 262 within the interior of the tank container 258. When the recovery tank 22 is mounted to the frame 18 as shown in FIG. 3, the inlet 264 is aligned with the flexible conduit 62 to establish fluid communication between the base 14 and the recovery tank 22. The standpipe 262 can be integrally formed with the tank container 258.

The recovery tank 22 further includes a lid 268 sized for receipt on the tank container 258. The lid 268 at least partially encloses an open top of the tank container 258. and can further define an air outlet 270 of the recovery tank 22 leading to the downstream suction source 56. A gasket 272 is positioned between mating surfaces of the lid 268 and the tank container 258 and creates a seal therebetween for prevention of leaks.

A recovery tank latch 274 can optionally be supported by the lid 268 for securing the recovery tank 22 to the upright body 12 within the recovery tank receiver 218 (FIG. 11). The latch 274 can be configured to releasably lock the recovery tank 22 to the upright body 12, such that a user must actuate the latch 274 before pulling the tank 22 off the frame 18. The hand grip 226 on the recovery tank 22 can be located below the latch 274 and can facilitate removal of the recovery tank 22 from the frame 18.

The recovery tank 22 can further include a filter 276 provided at the air outlet 270. The filter 276 can be supported by the lid 268 and can comprise a pleated filter. In one embodiment, the pleated filter is made of a material that remains porous when wet. A mesh screen 278 can be carried by the lid 268 and can support the filter 276 thereon.

The recovery tank 22 can further include a removable strainer 280 configured to strain large debris and hair out of the tank container 258 prior to emptying. The strainer 280 is configured to collect the large debris and hair while draining fluid (e.g. liquid) and smaller debris back into the tank container 258. One example of a suitable strainer is disclosed in U.S. Patent Application Publication No. 2019/0159646, filed Nov. 30, 2017, which is incorporated herein by reference in its entirety.

For purposes of this description, large debris are any debris with a maximum dimension, such as a length or diameter, of greater than or equal to 0.5 mm to 6 mm, and preferably 3 mm, whereas small debris are any debris having a maximum dimension, such as a length or diameter, of less than that of the larger debris. An example of a piece of large debris includes a strand of hair with a length greater than 3 mm. Examples of small debris include coffee grounds and crumbs with diameters less than 3 mm.

The strainer 280 can comprises an elongated handle or grip 282 and a base 284. The strainer 280 can be removably mounted within the tank container 258 such that the base 284 is at a bottom end of the tank container 258 and the grip 282 extends toward a top end of the tank container 258. The base 284 can include a plurality of drain holes 286 for draining fluid when the strainer 280 is removed from the tank container 258, and optionally a raised rim 288 around its perimeter for containing debris. An opening 290 can also be provided in the base 284 for accommodating the standpipe 262. The base 284 can form a cup-shaped colander that retains large debris and hair.

The drain holes 286 can be circular or non-circular openings or apertures in the base 284. In one example, the size of the drain holes 286 can range in diameter from 0.5 mm to 6 mm, and optionally from 3 mm to 4 mm. Other embodiments of drain holes 286 are possible, including the strainer 280 having a grid or mesh on the base 284 defining the drain holes 286.

The base 284 can be configured to fit within the tank container 258 at a location spaced from a bottom wall 292 thereof. When the strainer 280 is inserted into the tank container 258, fluid and small debris can pass through the drain holes 286 to the area of the collection chamber 260 below the base 284, while large debris and hair is trapped above the base 284. Optionally, a stop 294 can be provided on the standpipe 262 that limits the insertion of the strainer 280 into the tank container 258 to maintain the base 284 spaced above the bottom wall 292.

As shown, the grip 282 can extends upwardly and/or vertically along the inner surface of the tank container 258 and can be oriented such that it is generally parallel to the longitudinal axis of the tank container 258, and optionally also to the standpipe 262. The strainer 92806 shown herein is further inserted and removed from the tank container 258 along a direction that is parallel to, or coincident with, the longitudinal axis of the tank container 258.

The base 284 extends from a lower end of the grip 282 to substantially cover the bottom wall 292 of the tank container 258, such that any large debris/hair is trapped by the base 284 above the bottom wall 292. The grip 282 can be offset and relatively slender to maximize space available in the collection chamber 260 for collecting debris and fluid.

In typical recovery tanks, large debris and hair is not strained out and is disposed of together with the fluid waste (e.g. liquid waste), which can potentially result in clogged drains and pipes. Alternatively, large debris and hair can be manually picked out of the recovery tank, which is unsanitary and laborious. With the strainer 280 according to the embodiment of the present invention disclosed herein, a user can simply remove the lid 268 and lift the strainer 280 out. The strainer 280 separates out large debris and hair while fluid and smaller debris drains back into the tank container 258. The long grip 282 prevents a user from contact with any of the collected debris or fluid. Thus, a user can easily and sanitarily dispose of any large debris and hair in the trash, prior to emptying the fluid waste down a sink, toilet, or other drain thereby avoiding the problems with prior recovery tanks. The strainer 280 can be particularly helpful for use with a multi-surface vacuum cleaner because these types of vacuum cleaners ingest wet and dry debris, including large dry debris, and deposit the debris mixture into a single recovery tank.

In one embodiment, the recovery tank 22 can have a liquid level sensing system 296 configured to detect liquid at one or more levels within the recovery tank 22 and determine when to shut-off or otherwise interrupt the recovery system. The sensing system 296 can include any suitable components for sensing liquid within the recovery tank 22. With the provision of the sensing system 296, the recovery tank 22 does not require an in-tank float-style shut off. In other words, the recovery tank 22 is a floatless tank. One example of a suitable floatless tank and sensing system is disclosed in U.S. Provisional Application No. 62/688,428, filed Jun. 22, 2018, which is incorporated herein by reference in its entirety. The '428 application further discloses a system and method for sensing foam in the tank 22, which can be provided on the apparatus 10 shown herein.

In the illustrated example, the sensing system 296 includes at least one sensor 298, 300, optionally in the form of at least one probe, which can detect liquid. In the illustrated embodiment, two sensors 298, 300 in the form of probes are included, through other numbers and forms of sensors are possible. The sensors 298, 300 can be electrically coupled with power terminals 302, optionally provided on the lid 268, which couple with electrical contacts (not shown) on the recovery tank receiver 218 when the recovery tank 22 is mounted on the frame 18 to supply power to the sensors 298, 300. The electrical contacts on the recovery tank receiver 218 are electrically coupled with a power source of the apparatus 10, an example of which is described in further detail below.

The sensors 298, 300 can optionally be supported by the lid 268 or, or more particularly by at least one bracket 306 formed on or otherwise coupled with the lid 268. In the illustrated embodiment, two brackets 306 depending downwardly from the lid 268 are included, through other numbers and forms of brackets are possible. The brackets 306 can be offset from the standpipe 262. When the lid 268 is coupled to the container 258, the brackets 306 can project into the collection chamber 260. It is further contemplated that the sensors 298, 300 can be molded directly into the side walls of the container 258, thereby eliminating the brackets 306.

Figure 15:
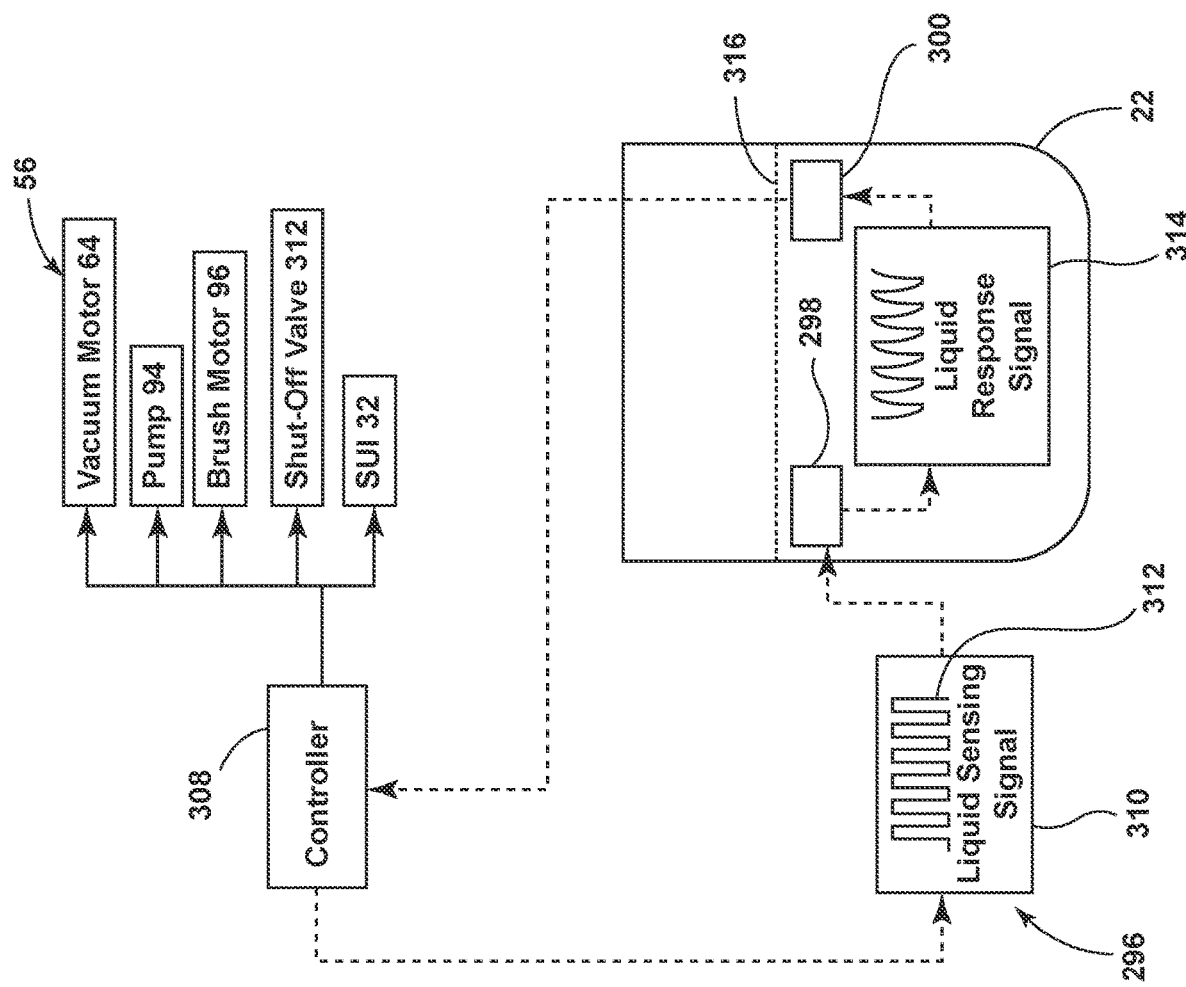
FIG. 15 is a schematic view of one embodiment of a liquid level sensing system for the surface cleaning apparatus.

FIG. 15 is a schematic view of the sensing system 296 for the apparatus 10. The various sensors 298, 300 are coupled with a controller 308. The controller 308 can also be operationally connected to other components of the apparatus 10, as described in further detail below. The first sensor 298 can emit a liquid sensing signal 310 from the controller 308 at a given frequency 312. The liquid sensing signal 310 travels through contents of the recovery tank 22 to form a liquid response signal 314 that is detected by the second sensor 300 and communicated to the controller 308. The second sensor 300 can be located in the recovery tank 22 at a critical liquid level 316. The term critical liquid level is used herein to define a level or location where, if liquid is present, at least one electrical component of the apparatus 10 is shut down to prevent liquid ingress into the suction source 56. If the liquid response signal 314 indicates that the liquid in the recovery tank 22 is at or above the critical level 316, the controller 308 can turn off the at least one electrical component of the apparatus 10. Such components can include the suction source 56 itself, and more particularly the vacuum motor 64, and optionally also the pump 94 and/or the brush motor 96.

In yet another configuration, the controller 308 can additionally or alternatively activate a shut-off valve 318 in response to the liquid response signal 314 to prevent liquid ingress into the suction source 56. The shut-off valve 318 can be provided for interrupting suction when liquid in the recovery tank 22 reaches the critical level 316. The shut-off valve 318 can be positioned in any suitable manner and include any suitable type of valve.

Additionally or alternatively, the controller 308, based on the liquid response signal 314, can provide a visual or audible status indication such as a light or sound via the SUI 32. The visual or audible status indication can alert the user that the liquid is too high in the recovery tank 22 or that a component of the apparatus 10 has been turned off.

Optionally, the sensing system 296 can include electronic components to capacitively couple and smooth the response signals such that the rise time or the average amplitude of the voltage of the received signals can be determined. In another non-limiting example, the controller 308 can be configured to perform one or more signal processing algorithms on the received response signals to determine one or more characteristics of the received response signal. Signal processing algorithms incorporated into the controller 308 for assisting in the determination of one or more characteristics of the received signals can include, but are not limited to, blind source separation, principal component analysis, singular value decomposition, wavelet analysis, independent component analysis, cluster analysis, Bayesian classification, etc.

It is contemplated that any of the sensors 298, 300 of the sensing system 296 can be configured to transmit, receive or transmit and receive one or more sensing signals. The sensing signals can include any waveform useful in sensing liquid, including, but not limited to, square waves, sine waves, triangle waves, sawtooth waves, and combinations thereof. Furthermore, the sensing signals can include any frequency useful in sensing liquid, including, but not limited to, frequencies ranging from approximately 10 kilohertz to 10 megahertz. In one non-limiting example, the liquid sensing signals can be multiplexed and transmitted simultaneously to one or more sensors.

The recovery tank 22 can be periodically emptied of collected fluid and debris by removing the recovery tank 22 from the frame 18, removing the lid 268 from the tank container 258, which also removes the sensors 298, 300 and brackets 306. Next, a user lifts the strainer 280 out of the tank container 258. As the strainer 280 is lifted, large debris and hair is captured while fluid and smaller debris is allowed to drain back into the container 258. The user can then dispose of any debris on the strainer 280 in the trash, and then dispose of the remaining fluid and smaller debris in the tank container 258 in a sink, toilet, or other drain.

Figure 16B:
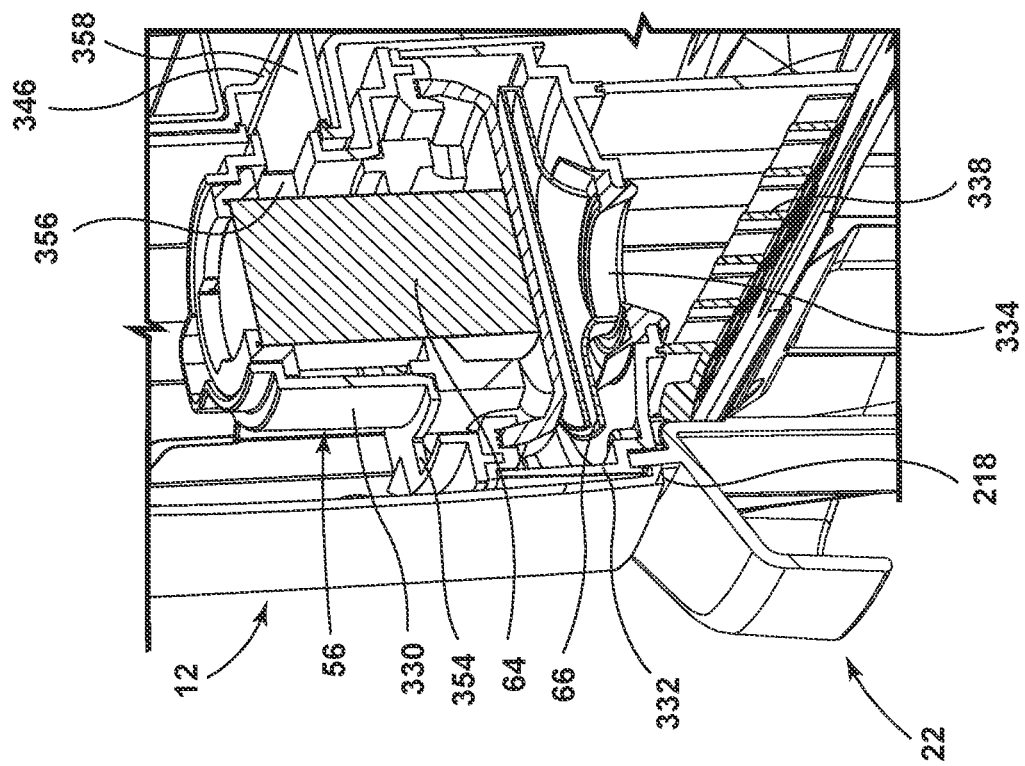
FIG. 16B is a sectional view showing portions of a recovery pathway and a motor cooling air path of the apparatus.
Figure 16A:
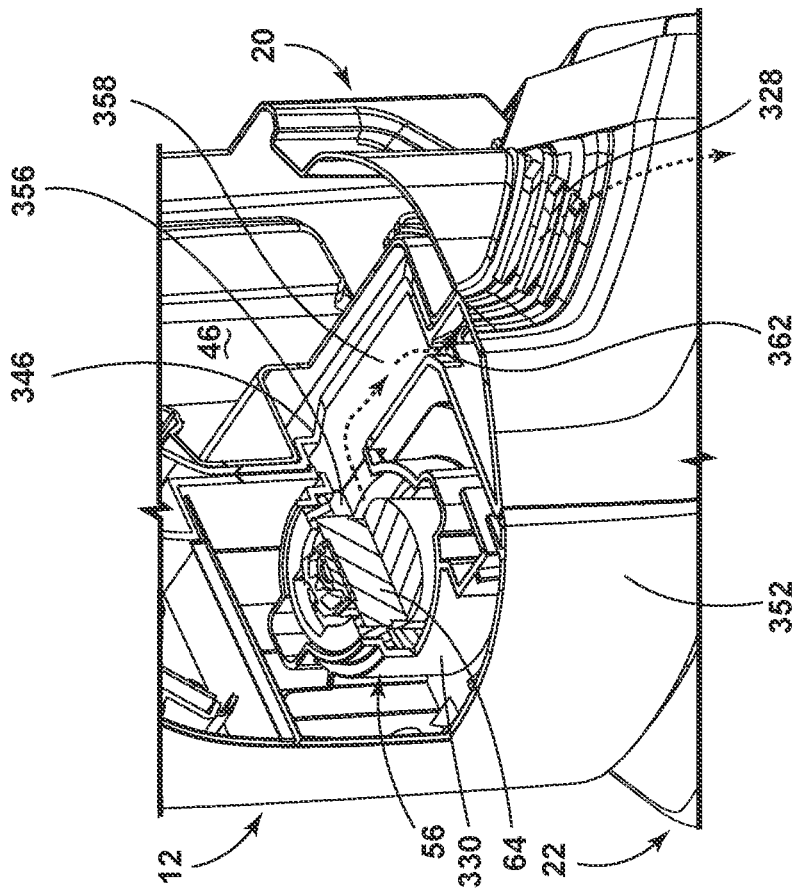
FIG. 16A is a sectional view showing portions of a recovery pathway and a motor cooling air path of the apparatus.
Figure 17:
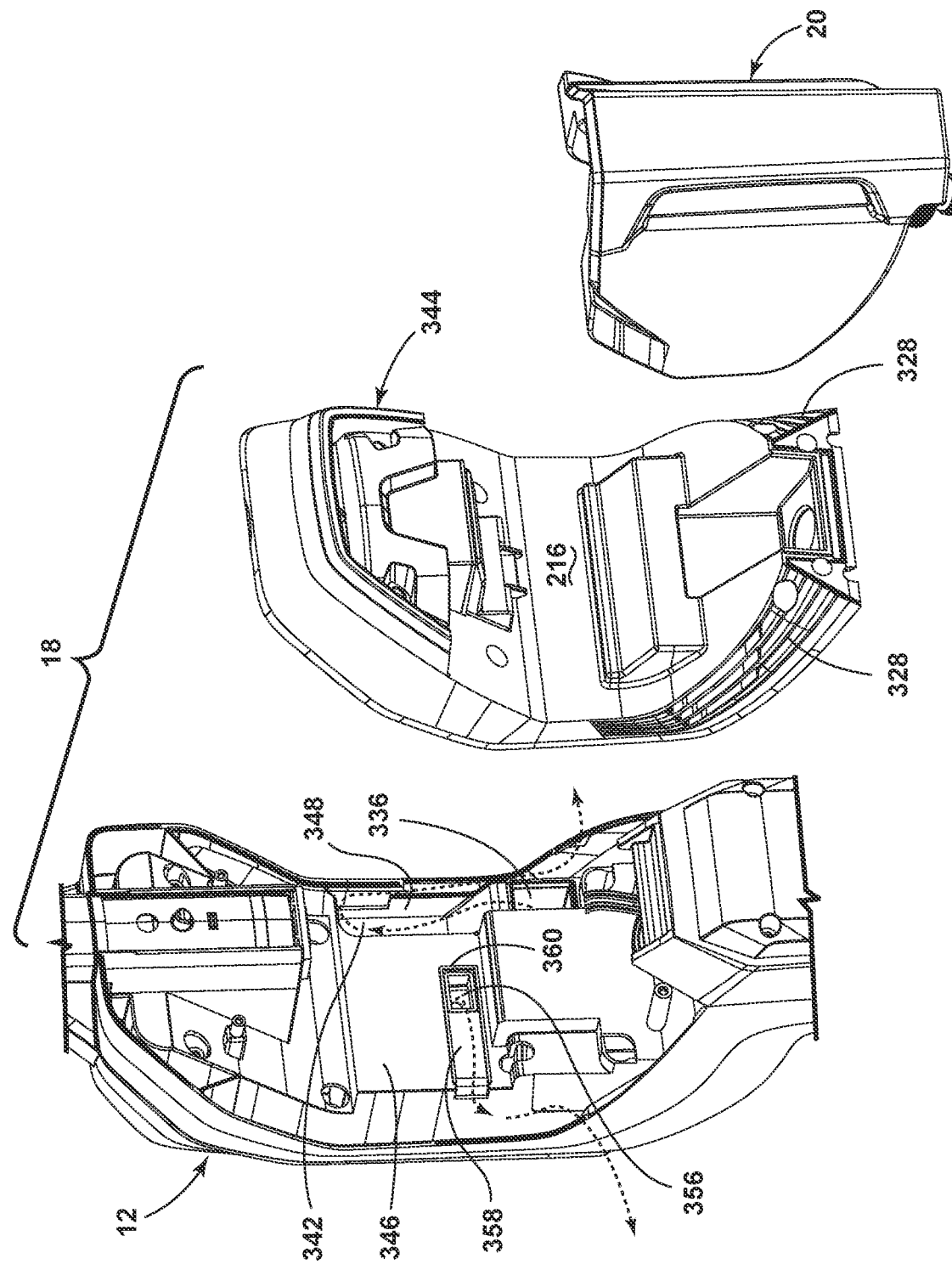
FIG. 17 is a partially-exploded rear perspective view of the surface cleaning apparatus, showing portions of a working air exhaust path and a motor cooling air path of the apparatus.

Referring to FIGS. 16A, 16B, and 17, downstream of the recovery tank 22, the recovery pathway can include suction source 56 and at least one exhaust vent 328 defining the clean air outlet 52. In the illustrated embodiment, two exhaust vents 328 are provided on opposing sides of the frame 18, through other numbers and locations for the exhaust vents 328 are possible. The vacuum motor 64 is enclosed within a motor housing 330 and the fan 66 is enclosed within a fan housing 332 and the housings 330, 332 may be made of one or more separate pieces. The fan housing 332 includes at least one inlet aperture 334 for drawing working air into the fan housing 332 and at least one outlet aperture 336 through which working air is exhausted. The recovery tank receiver 218 can include a grille 338 in register with the inlet aperture 334 and in fluid communication with the air outlet 270 of the recovery tank 22 when the tank 22 is seated in the receiver 218.

The recovery pathway can further include a portion defining an air exhaust path, which extends from the fan outlet aperture 336 to the clean air outlet or exhaust vents 328. The air exhaust path can be defined by at least one working air exhaust duct or conduit 342, with the fan outlet aperture 336 in fluid communication with a first end of exhaust conduit 342 and the clean air outlet 52 in fluid communication with a second end of the exhaust conduit 342.

The exhaust conduit 342 can be formed internally between housings of the upright body 12, and more specifically can be formed between housings forming the frame 18. Routing the working air exhaust internally within the handle housings reduces noise from the vacuum motor 64. In the illustrated embodiment, the exhaust conduit 342 can be formed by first and second frame housings 344, 346. The first frame housing 344 can define an exterior surface of the upright body 12 which is visible to the user, including a portion of a rear of the frame 18. The second frame housing 346 can define an interior surface of the upright body 12 which is not visible to the user and which can be at least partially covered by the first frame housing 344. The first and second frame housings 344, 346 can include mating portions of the exhaust conduit 342. The first and second frame housings 344, 346 can optionally comprise molded parts, with the mating portions of the exhaust conduit 342 integrally formed therewith. Optionally, the first frame housing 344 can define the supply tank receiver 216. In this case, the supply tank 20 mounted on the supply tank receiver 216 provides further insulation from operational noise generated by the vacuum motor 64.

The exhaust conduit 342 can include at least one louver or baffle which directs air flow. The at least one louver or baffle can provide a tortuous exhaust path that extends from the fan outlet aperture 336 to the exhaust vents. The tortuous exhaust path can comprise multiple turns of at least 90 degrees, and can optionally include at least one turn of greater than 90 degrees, for example 180 degrees or greater. In the embodiment shown, a 90 degree turn is provided into the exhaust conduit 342 at the fan outlet aperture 336, and a 180 degree turn is provided at a baffle 348 separating sections of the exhaust conduit 342. The sections of the exhaust conduit 342 separated by the baffle 348 can run parallel to each other, which increases the length of the exhaust path to further reduces noise at the exhaust vents.

In one embodiment, a motor cooling air path is provided for supplying cooling air to the vacuum motor 64 and for removing heated cooling air (also referred to herein as "heated air") from the vacuum motor 64. The motor cooling air path includes a cooling air inlet and a cooling air outlet, both of which are in fluid communication with the ambient air outside the apparatus 10. Ambient air is drawn into the apparatus 10 through the cooling air inlet, passes through the vacuum motor 64, and is subsequently exhausted through the cooling air outlet. In the embodiment illustrated, the cooling air inlet is provided by gaps between the housings forming the upright body 12, including between the first frame housing 344 and a third frame housing 352. The third frame housing 352 can define an exterior surface of the upright body 12 which is visible to the user, including a portion of a side and/or front of the frame 18. Alternatively, a dedicated cooling air inlet can be provided in the upright body 12, such as through one of the housings of the frame 18. The cooling air outlet is provided by the clean air outlet 52, i.e. the exhaust vents 328, and as such the motor cooling air path and the working air exhaust path share a common outlet.

The motor housing 330 includes at least one inlet aperture 354 for allowing cooling air to enter the motor housing 330 and pass by the vacuum motor 64, and at least one outlet aperture 356 through which heated cooling air is exhausted. The motor cooling air path can be defined by at least one heated air exhaust duct or conduit 358 for allowing heated air to be transported away from the vacuum motor 64, with the motor outlet aperture 356 in fluid communication with a first end of the exhaust conduit 358 and the exhaust vents 328 in fluid communication with a second end of the exhaust conduit 358.

The heated air exhaust conduit 358 can be formed internally between housings of the upright body 12, and more specifically can be formed between the first and second frame housings 344, 346 forming the frame 18. Routing the heated air exhaust internally within the handle housings 344, 346 reduces noise from the vacuum motor 64. The first and second frame housings 344, 346 can include mating portions of the heated air exhaust conduit 358. The first and second frame housings 344, 346 can optionally comprise molded parts, with the mating portions of the exhaust conduit 358 integrally formed therewith. In the illustrated embodiment, the motor outlet aperture 356 can jut rearwardly to an opening 360 in the second frame housing 346 to enter the heated air exhaust conduit 358.

Optionally, the motor cooling air path can have a tortuous exhaust path that extends from the motor outlet aperture 356 to the exhaust vents, and include at least one louver or baffle (not shown) which directs air flow. The motor and airflow noise generated by the apparatus 10 during operation is dampened by the torturous exhaust path. The tortuous exhaust path can comprise multiple turns of at least 90 degrees. In the embodiment shown, a first 90 degree turn is provided into the exhaust conduit 358 at the motor outlet aperture 356, and a second 90 degree turn is provided at a passage 362 separating a first section of the exhaust conduit 358 from a second section which includes the exhaust vents 328.

Figure 18:
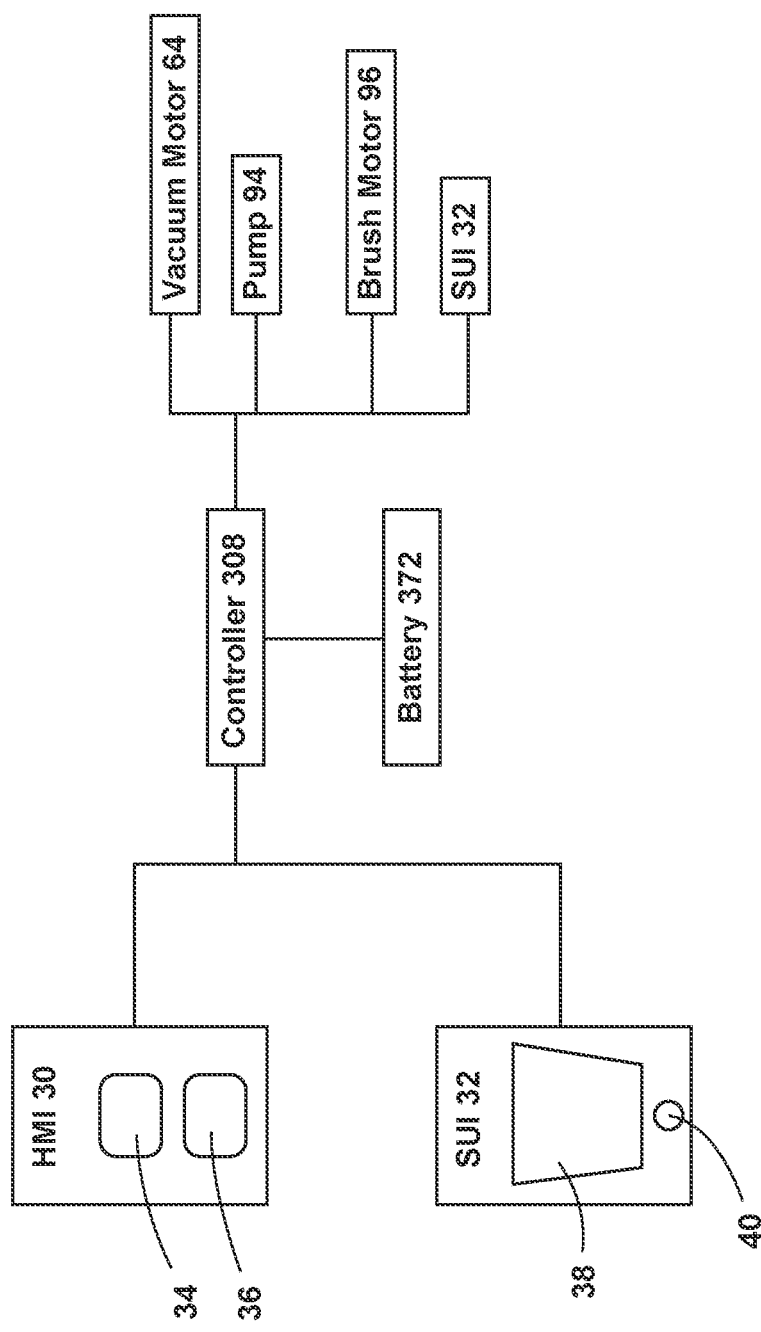
FIG. 18 is a schematic control diagram for the surface cleaning apparatus.

FIG. 18 shows one example of a schematic control diagram for the apparatus 10. As briefly mentioned above, the surface cleaning apparatus 10 can further include a controller 308 operably coupled with the various function systems, such as the fluid delivery and recovery systems, of the apparatus 10 for controlling its operation. The controller 308 is operably coupled with the HMI 30 for receiving inputs from a user and with the SUI 32 for providing one or more indicia about the status of the apparatus 10. In one embodiment, the controller 308 can comprise a microcontroller unit (MCU) that contains at least one central processing unit (CPU). In the embodiment shown, the controller 308 is operably coupled with at least the vacuum motor 64, the pump 94, and the brush motor 96 for the brushroll 60.

Electrical components of the surface cleaning apparatus 10, including the vacuum motor 64, the pump 94, and the brush motor 96 for the brushroll 60, can be electrically coupled to a power source such as a battery 372 or a power cord plugged into a household outlet. In the illustrated embodiment, the power source comprises a rechargeable battery 372. In one example, the battery 372 can be a lithium ion battery. In another exemplary arrangement, the battery 372 can comprise a user replaceable battery.

As discussed above, the power input control 34 which controls the supply of power to one or more electrical components of the apparatus 10, and in the illustrated embodiment controls the supply of power to at least the SUI 32, the vacuum motor 64, the pump 94, and the brush motor 96. The cleaning mode input control 36 cycles the apparatus 10 between a hard floor cleaning mode and a carpet cleaning mode. In one example of the hard floor cleaning mode, vacuum motor 64, the pump 94, and the brush motor 96 are activated, with the pump 94 operating at a first flow rate. In the carpet cleaning mode, the vacuum motor 64, the pump 94, and the brush motor 96 are activated, with the pump 94 operating at a second flow rate which is greater than the first flow rate. The self-cleaning mode input control 40 initiates a self-cleaning mode of operation, one embodiment of which is described in detail below. Briefly, during the self-cleaning mode, a cleanout cycle can run in which cleaning liquid is sprayed on the brushroll 60 while the brushroll 60 rotates. Liquid is extracted and deposited into the recovery tank, thereby also flushing out a portion of the recovery pathway.

With reference to FIG. 3, the controller 308 can be provided at various locations on the apparatus 10, and in the illustrated embodiment is located in the upright body 12, within the frame 18, and is integrated with the SUI 32. Alternatively, the controller 308 can be integrated with the HMI 30 (FIG. 1), or can be separate from both the HMI 30 and SUI 32.

The battery 372 can be located within a battery housing 374 located on the upright body 12 or base 14 of the apparatus, which can protect and retain the battery 372 on the apparatus 10. In the illustrated embodiment, the battery housing 374 is provided on the frame 18 of the upright body 12. Optionally, the battery housing 374 can be located below the supply tank 20 and/or rearwardly of the recovery tank 22. The bumper 44 can be provided on a rear exterior side of the battery housing 374.

Figure 19:
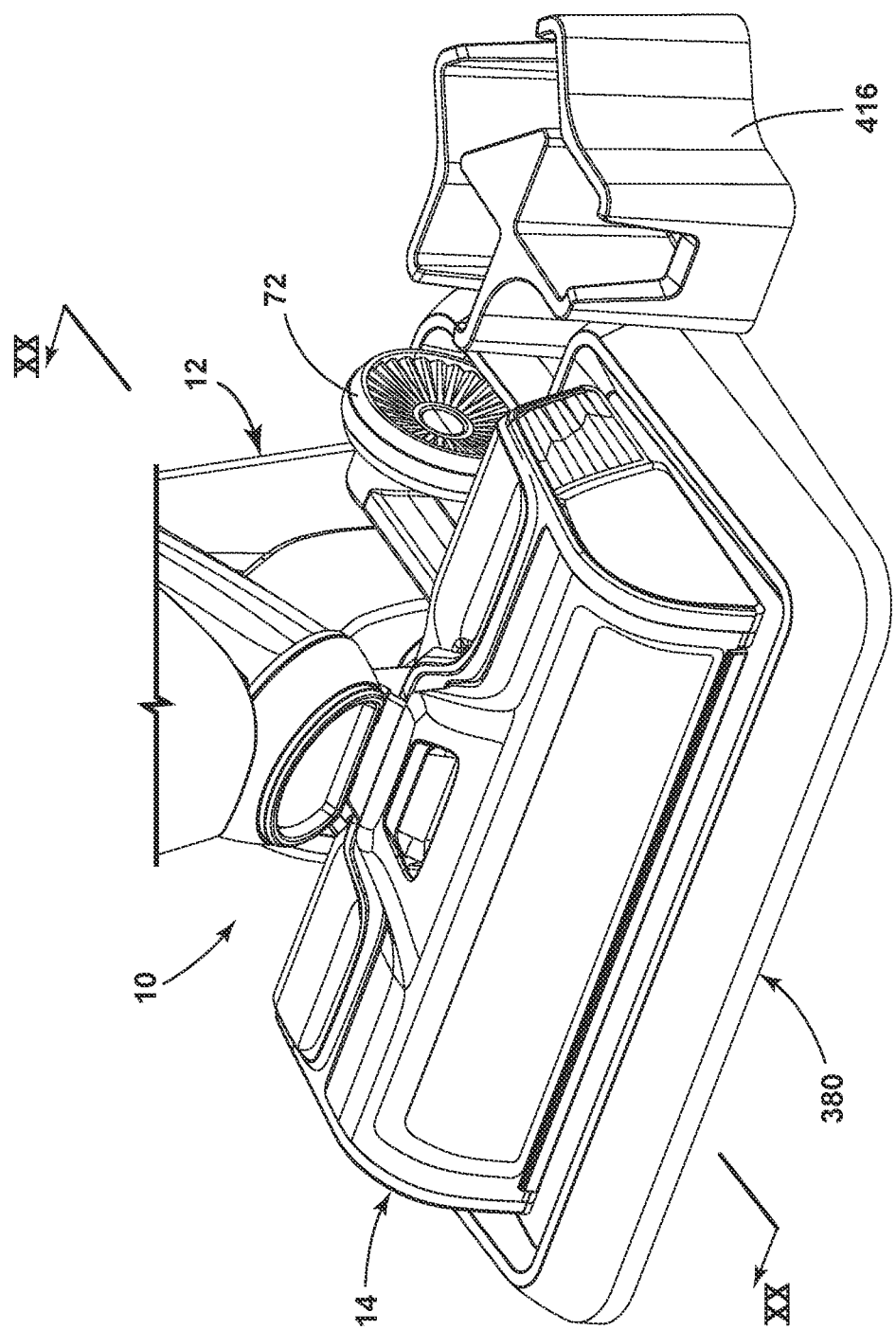
FIG. 19 is an enlarged perspective view of the apparatus 10 docked with a storage tray according to one embodiment of the invention.

Referring to FIG. 19, the surface cleaning apparatus 10 can optionally be provided with a storage tray 380 that can be used when storing the apparatus 10. The storage tray 380 can be configured to receive the base 14 of the apparatus 10 in an upright, stored position. The storage tray 380 can further be configured for further functionality beyond simple storage, such as for charging the apparatus 10 and/or for self-cleaning of the apparatus 10.

Figure 20:
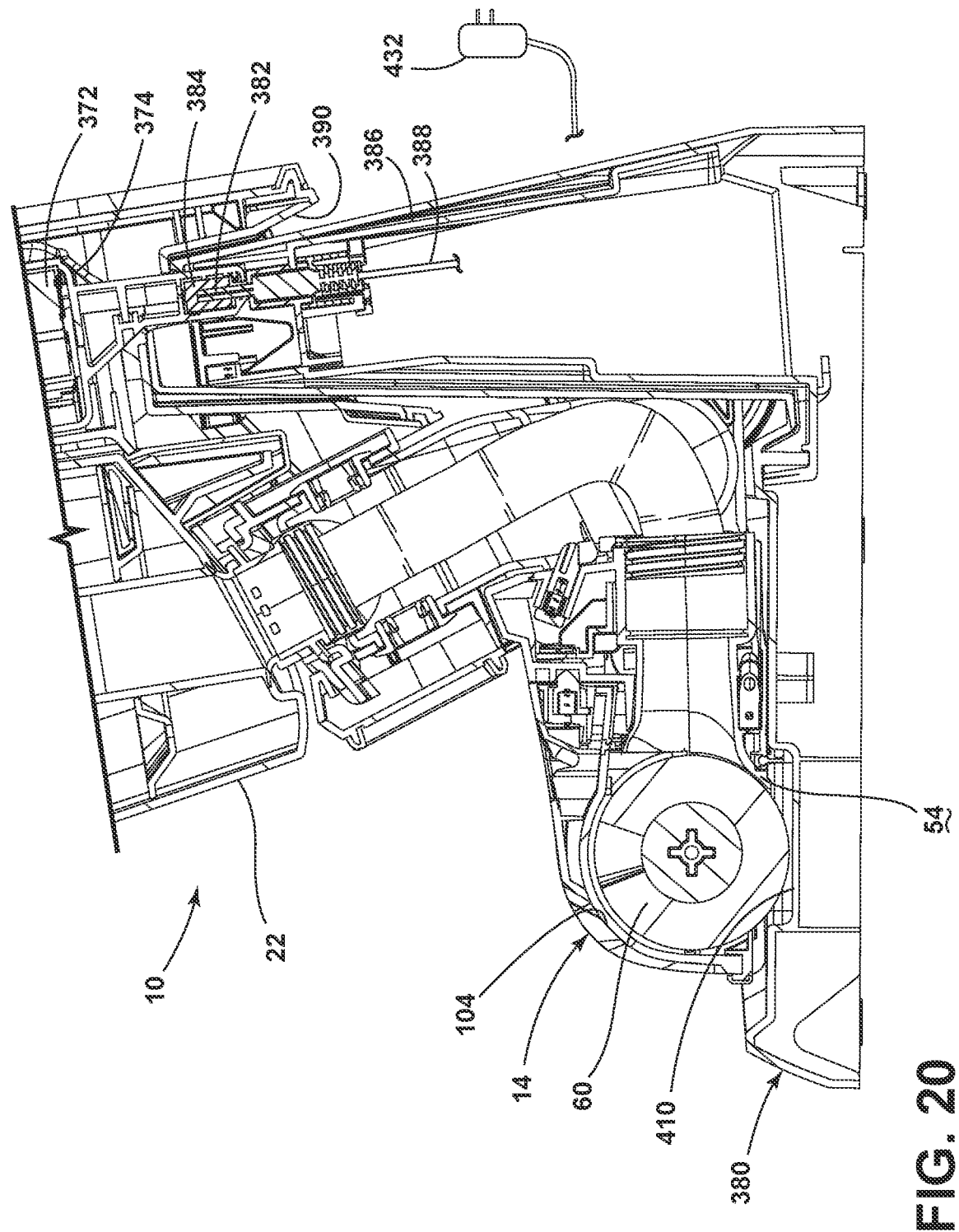
FIG. 20 is an enlarged cross-sectional view of a lower portion of the surface cleaning apparatus docked with the storage tray, taken through line XX-XX of FIG. 19.

Referring to FIG. 20, in the illustration embodiment, the storage tray 380 functions as a docking station for recharging the battery 372 of the apparatus 10. The storage tray 380 can optionally having at least one charging contact 382, and at least one corresponding charging contact 384 can be provided on the apparatus 10, such as on the exterior of the battery housing 374. When operation has ceased, the apparatus 10 can be locked upright and placed into the storage tray 380 for recharging the battery 372. When the apparatus 10 is removed from the storage tray 380, one or both of the charging contacts 382, 384 can be shielded, as described in further detail below. One example of a storage tray with shielded charging contacts is disclosed in U.S. Provisional Application No. 62/671,119, filed Jun. 22, 2018, which is incorporated herein by reference in its entirety.

A charging unit 386 is provided on the storage tray 380 and comprises the charging contacts 382. The charging unit 386 can electrically couple with the battery 372 when the base 14 of the apparatus 10 is docked with the storage tray 380. The charging unit 386 can be electrically coupled to a power source including, but not limited to, a household outlet. In one example, a cord 388 can be coupled with the charging unit 386 to connect the storage tray 380 to the power source.

The battery housing 374 and the charging unit 386 of the storage tray 380 can possess complementary shapes, with the battery housing 374 fitting against the charging unit 386 to help support the apparatus 10 on the storage tray 380. In the illustrated embodiment, the battery housing 374 can include a socket 390 containing the charging contacts 384 and the charging unit 386 can be at least partially received by the socket 390 when the apparatus 10 is docked with the tray 380.

Figure 21:
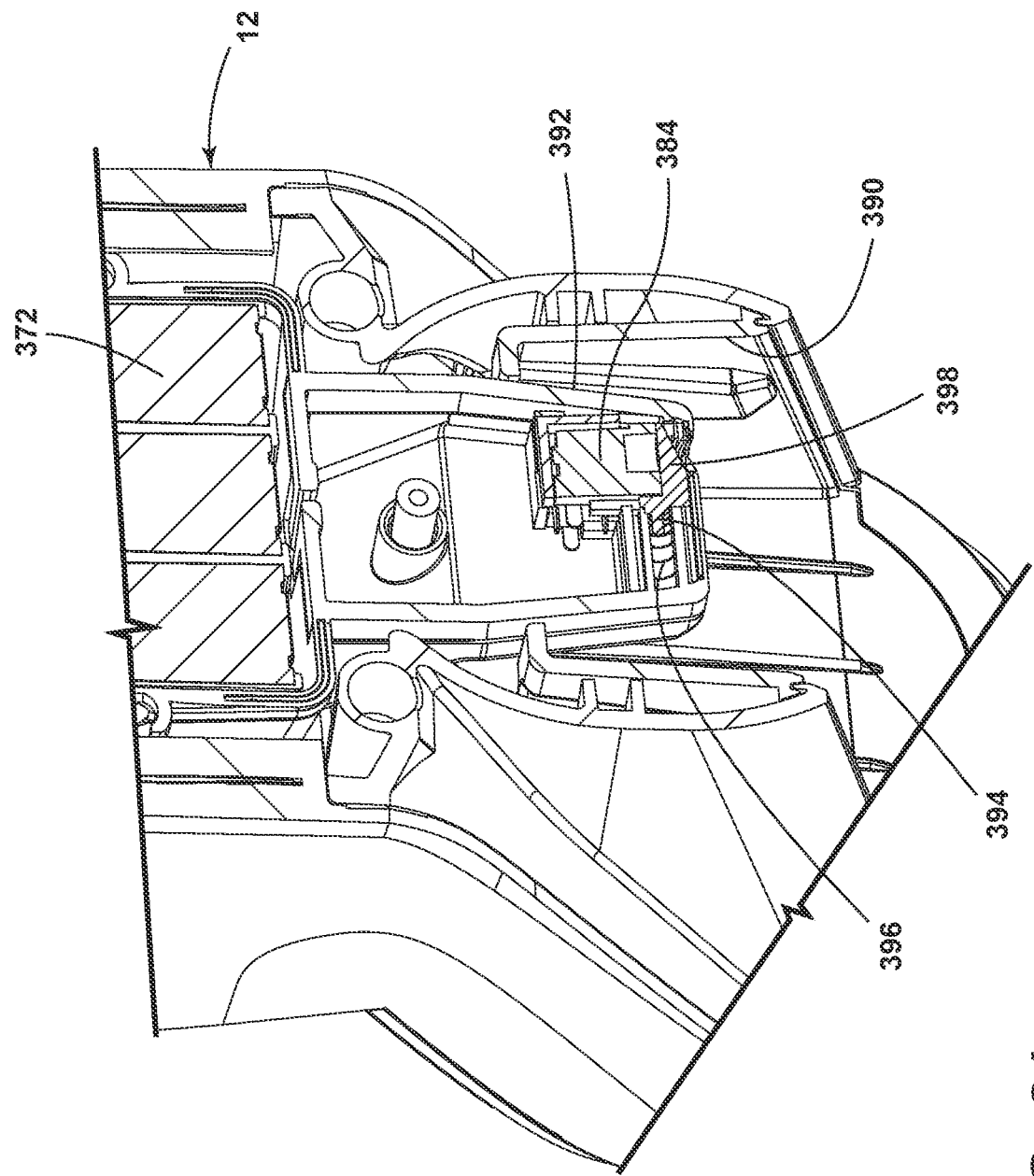
FIG. 21 is an enlarged cross-sectional view of a lower portion of the surface cleaning apparatus taken through line XXI-XXI of FIG. 19, showing a shielded electrical contact of the apparatus.

FIG. 21 is a rear perspective view of a lower portion of the upright body 12 showing a cross-section through the charging contact 384 of the battery 372. A contact casing 392 can extend downwardly within the socket 390, and includes the charging contact 384, which is illustrated as DC connector or socket. The charging contact 384 or socket can be normally covered, or closed, by a retractable charging contact cover 394, also referred to herein as battery-side cover. The battery-side cover 394 can be slidably mounted to or within the casing 392 and can be biased to the normally covered position by a spring 396. When the battery-side cover 394 is in the closed position, the battery-side cover 394 shields the charging contact 384 such that liquid cannot enter the charging contact 384 or casing 392.

The battery-side cover 394 can include a ramp 398 against which a portion of the storage tray 380 presses to move the cover 394 to uncover the charging contact 384 against the biasing force of the spring 396. It is noted that while a ramp 398 is shown, the apparatus 10 can include any suitable mating feature configurable to move the cover 394 upon docking, such as a cam or a rack and pinion gear, for example. Alternatively, a linear actuator can be incorporated to move the cover 394 to the open position upon docking.

Figure 22:
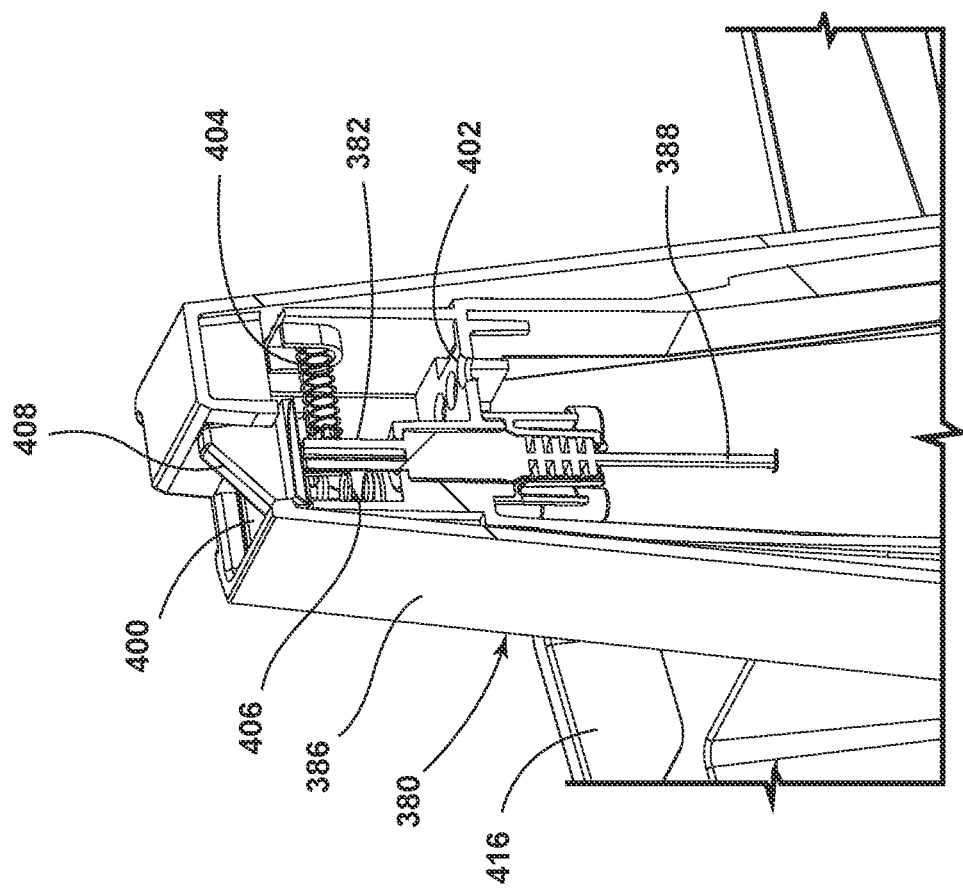
FIG. 22 is an enlarged cross-sectional view of a portion of the storage tray taken through line XXII-XXII of FIG. 19, showing a shielded electrical contact of the tray.

Referring to FIG. 22, the charging contact 382 of the charging unit 386, which is illustrated as DC connector or plug, can be normally covered, or closed, by a retractable charging contact cover 400, also referred to herein as tray-side cover. A bracket 402 can be provided in the charging unit to mount the charging contact or plug 382 and the cover 400. The tray-side cover 400 can be biased to the normally covered position by springs 404, 406, which bias the cover 400 rearwardly and upwardly. When the tray-side cover 400 is in the closed position, the tray-side cover 400 shields the charging contact 382 such that liquid cannot enter the charging contact 382 or charging unit 386.

The tray-side cover 400 can include a ramp 408 against which a portion of the apparatus 10 presses to move the cover 400 to uncover the charging contact 382 against the biasing force of the springs 404, 406. It is noted that while a ramp 408 is shown, the apparatus 10 can include any suitable mating feature configurable to move the cover 400 upon docking, such as a cam or a rack and pinion gear, for example. Alternatively, a linear actuator can be incorporated to move the cover 400 to the open position upon docking.

Figure 23:
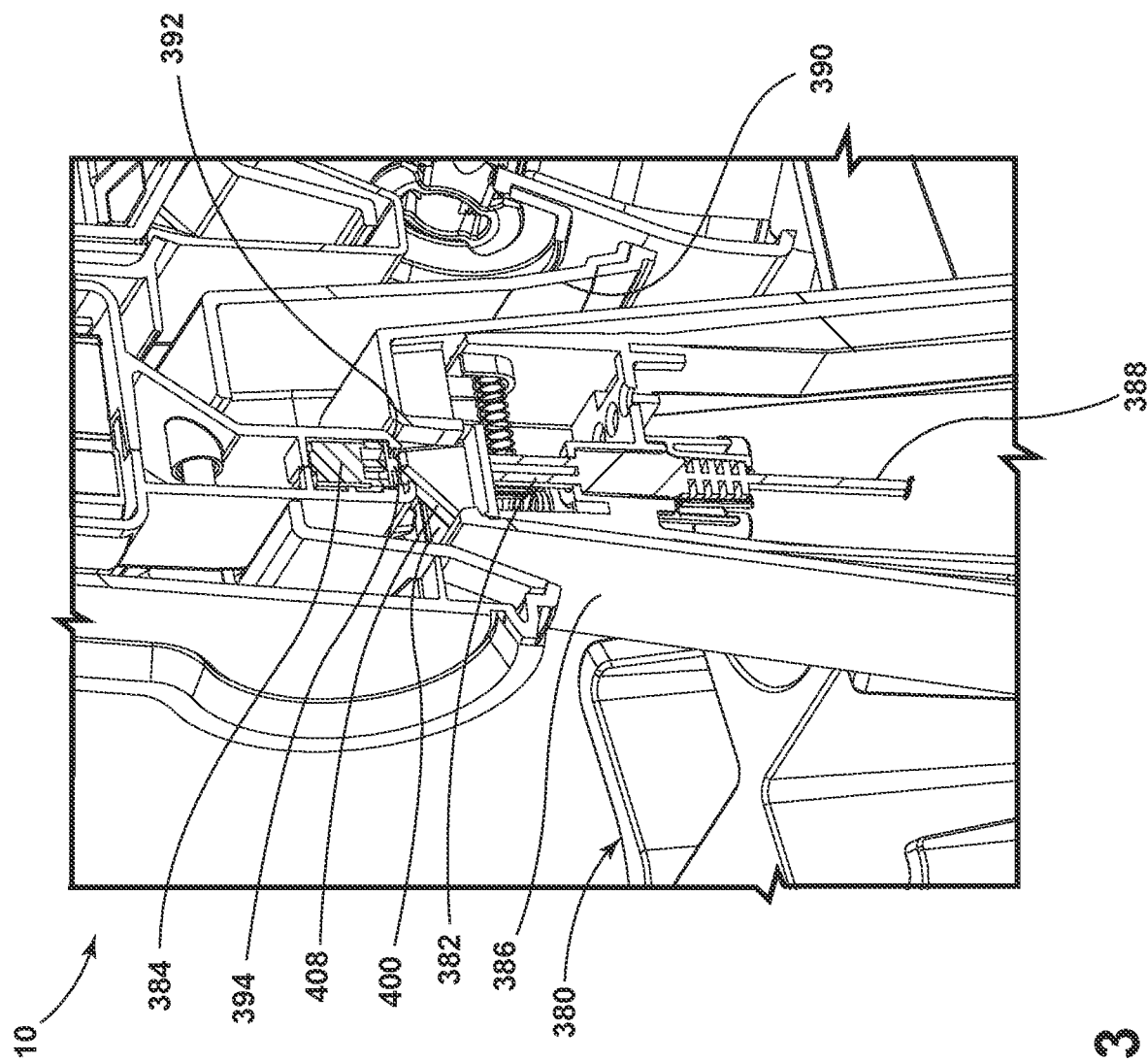
FIGS. 23-25 illustrate a docking operation of the surface cleaning apparatus with the storage tray.
Figure 24:
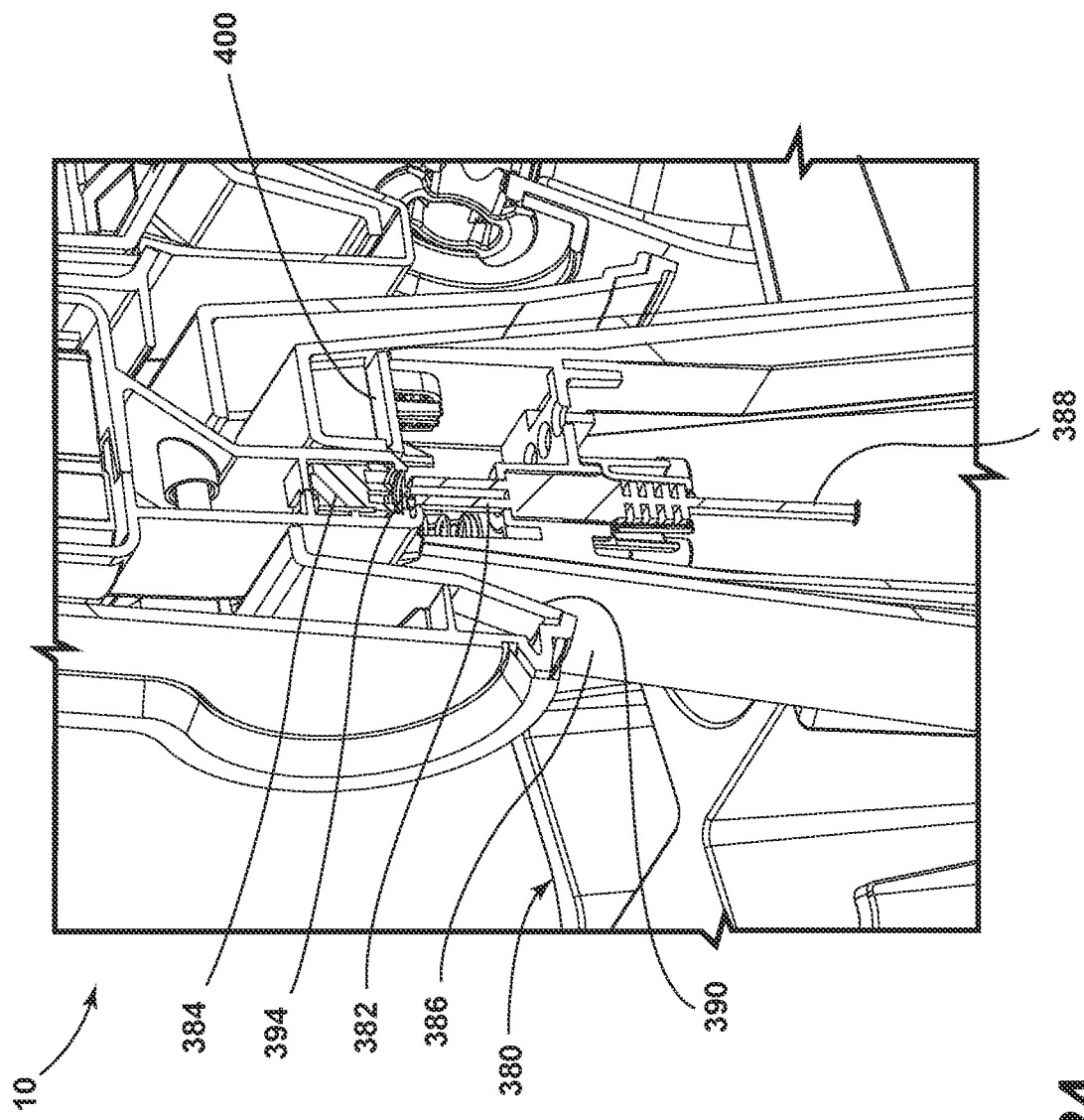
Figure 25:
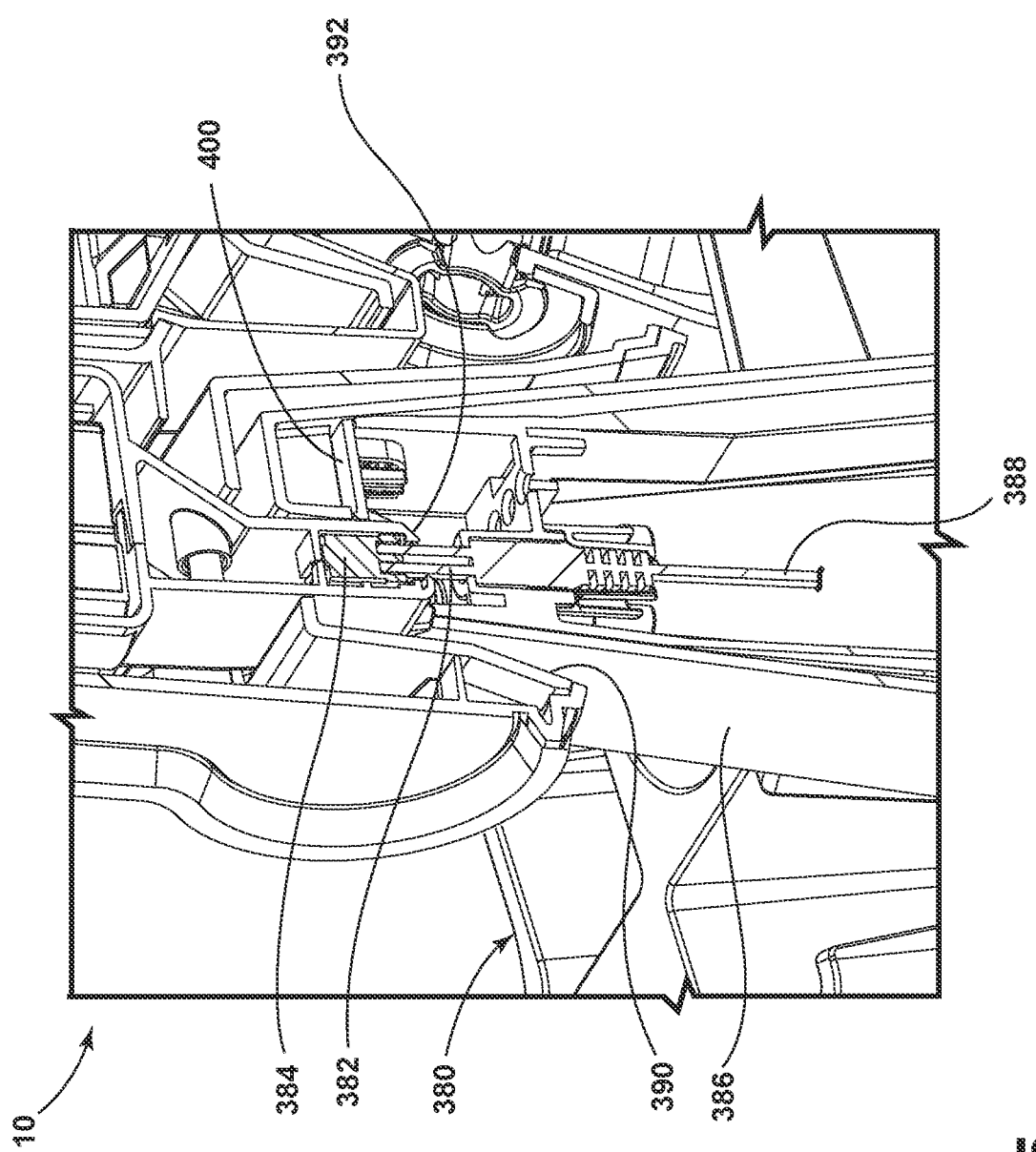

Docking the apparatus 10 with the storage tray 380 can automatically move the covers 394, 400 to an uncovered or open position, an example of which is shown in FIGS. 23-25, in which the charging contacts 382, 384 can be coupled, i.e. by the socket 384 receiving the plug 382. In one embodiment, in order to dock the apparatus 10 within the storage tray 380 for charging, the apparatus 10 is lowered into the storage tray 380 as shown in FIG. 23 and the casing 392 pushes against the ramp 408 on the tray-side cover 400, sliding the cover 400 forwardly to expose the charging contact or plug 382. As the apparatus 10 continues to be lowered onto the storage tray 380, the exposed plug 382 presses against the ramp 398 on the battery-side cover 394, as shown in FIG. 24, sliding the cover 394 laterally to expose the charging contact or socket 384. Continued lowering of the apparatus 10 plugs the plug 382 into the socket 384, as shown in FIG. 25. The charging plug 382 on the storage tray 380 and socket 384 on the apparatus 10 become fully engaged, or electrically connected, when the apparatus 10 is fully seated on the storage tray 380.

Referring back to FIGS. 19-20, during use, the apparatus 10 can get very dirty, particularly in the brush chamber 104 and extraction pathway, and can be difficult for the user to clean. The storage tray 380 can function as a cleaning tray during a self-cleaning mode of the apparatus 10, which can be used to clean the brushroll 60 and internal components of the fluid recovery pathway of apparatus 10. Self-cleaning using the storage tray 380 can save the user considerable time and may lead to more frequent use of the apparatus 10. The storage tray 380 can optionally be adapted to contain a liquid for the purposes of cleaning the interior parts of apparatus 10 and/or receiving liquid that may leak from the supply tank 20 while the apparatus 10 is not in active operation. When operation has ceased, the apparatus 10 can be locked upright and placed into the storage tray 380 for cleaning. The apparatus 10 is prepared for self-cleaning by filling the storage tray 380 to a predesignated fill level with a cleaning liquid, such as water. The user can select the self-cleaning mode via the input control 40 (FIGS. 1 and 18). In one example, during the self-cleaning mode, the vacuum motor 64 and brush motor 96 are activated, which draws cleaning liquid in the storage tray 380 into the fluid recovery pathway. The self-cleaning mode can be configured to last for a predetermined amount of time or until the cleaning liquid in storage tray 380 has been depleted. Examples of self-cleaning cycles and storage trays are disclosed in U.S. Patent Application Publication No. 2018/0344112, filed May 31, 2018, which is incorporated herein by reference in its entirety.

The tray 380 can physically support the entire apparatus 10. More specifically, the base 14 can be seated in the tray 380. The tray 380 can have a recessed portion in the form of a sump 410 in register with at least one of the suction nozzle 54 or brushroll 60. Optionally, the sump 410 can sealingly receive the suction nozzle 54 and brushroll 60, such as by sealingly receiving the brush chamber 104. The sump 410 can fluidly isolate, or seal, the suction nozzle 54 and fluid distributor 90 (FIG. 5) within the brush chamber 104 to create a closed loop between the fluid delivery and fluid recovery systems of the apparatus 10. The sump 410 can collect excess liquid for eventual extraction by the suction nozzle 54. This also serves to flush out a recovery pathway between the suction nozzle 54 and the recovery tank 22.

Figure 26:
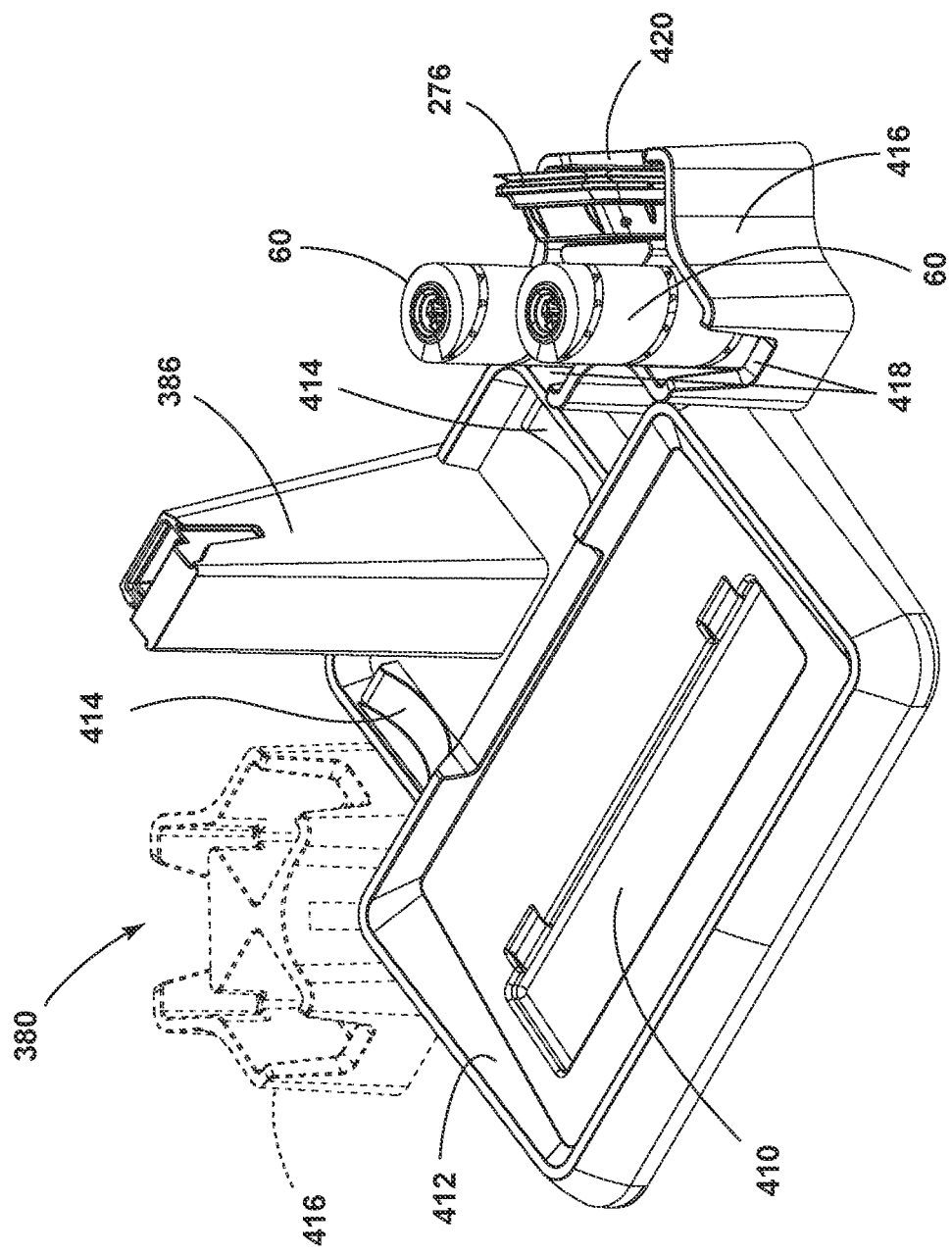
FIG. 26 is a perspective view of the storage tray from FIG. 19.

FIG. 26 is a perspective view of the storage tray 380. The tray 380 can include guide walls 412 extending upwardly and configured to align the base 14 within the tray 380. A rear portion of the tray 380 can comprise wheel holders 414 for receiving the rear wheels 72 of the apparatus 10. The wheel holders 414 can be formed as a recess, or groove in the storage tray 380, and can be provided on opposite lateral sides of the charging unit 386.

Optionally the storage tray 380 can include a removable accessory holder 416 for storing one or more accessories for the apparatus 10. The accessory holder 416 can be provided on an exterior side wall of the tray 380, and can be removably mounted to the tray 380. The tray 380 can optionally be provided with a mounting location on either lateral side of the tray 380 to allow the user some flexibility in where the accessory holder 416 is attached. FIG. 26 includes an accessory holder 416 in phantom line showing one optional alternative mounting location. The mounting locations can include a retention latch, sliding lock, clamp, brace, or any other mechanism in which to secure accessory holder 416 on the storage tray 380. Alternatively, storage tray 380 can be configured with a non-removable or integral accessory holder 416.

The illustrated accessory holder 416 can removably receive one or more brushrolls 60 and/or one of more filters 276 for the purposes of storage and/or drying. Accessory holder 416 can comprise one or more brushroll slots 418 to securely receive brushrolls 60 in a vertical fixed position for drying and storage. Brushroll slots 418 can be fixed or adjustable and can be comprised of clamps, rods, or molded receiving positions that can accommodate brushroll 546 with or without the dowel 110 inserted. Accessory holder 416 can comprise at least one filter slot 420 to securely receive filter 276 in a vertical fixed position for drying and storage. Alternatively, accessory holder 416 can store the brushrolls 60 and filter 276 in a variety of other positions.

Figure 27:
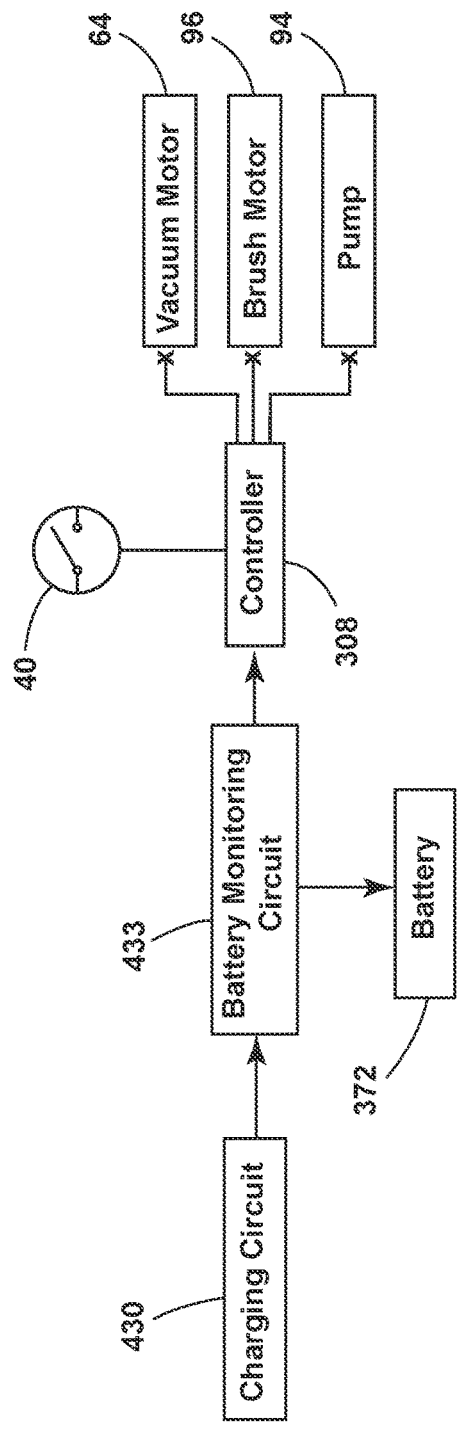
FIG. 27 is a block diagram for the surface cleaning apparatus, showing a condition when the surface cleaning apparatus is docked with the storage tray for recharging.

FIG. 27 is a block diagram for the apparatus 10, showing a condition when the apparatus 10 is docked with the storage tray 380 for recharging. The apparatus 10 includes a battery charging circuit 430 that controls recharging of the battery 372. When the apparatus 10 is docked with the storage tray 380, as shown in FIG. 20, the battery charging circuit 430 is active and the battery 372 is charged. In at least some embodiments of the storage tray 380, the tray 380 includes power cord 388 plugged into a household outlet, such as by a wall charger 432 having, for example an operating power of 35 W. However, during a self-cleaning cycle during which the vacuum motor 64, pump 94, and brush motor 96 are all energized, the required power draw can far exceed the operating power of the wall charger 432. In one example, the required power draw for the vacuum motor 64, pump 94, and brush motor 96 can be 200-250 W. The apparatus 10 can include a battery monitoring circuit 433 for monitoring the status of the battery 372 and individual battery cells contained therein. Feedback from the battery monitoring circuit 433 is used by the controller 308 to optimize the discharging and recharging process, as well as for displaying battery charge status on the SUI 32.

Figure 28:
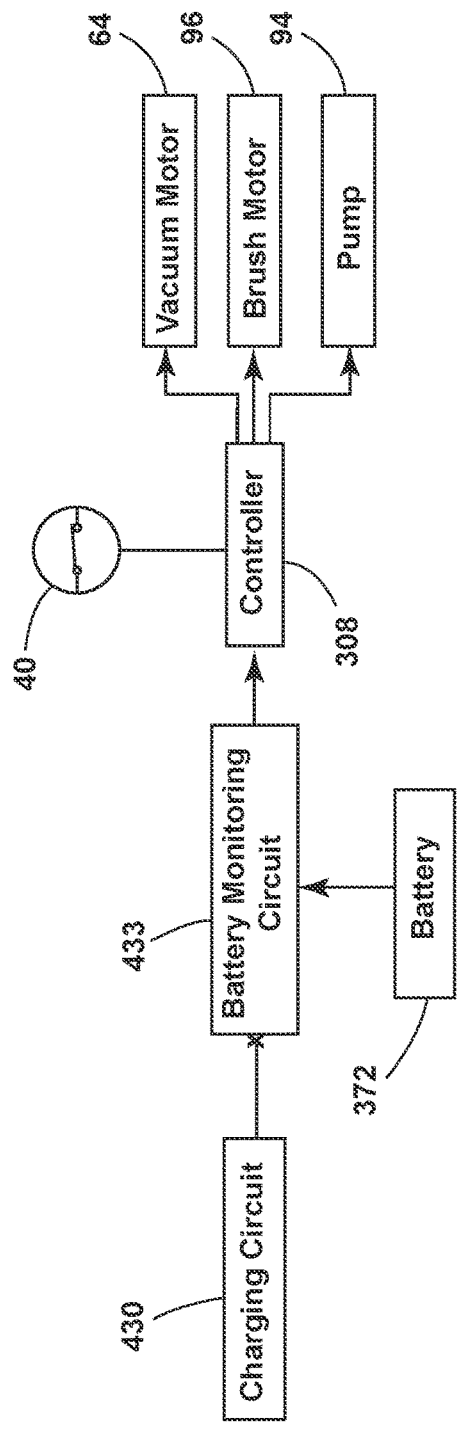
FIG. 28 shows the block diagram of FIG. 27 in a condition when the surface cleaning apparatus is docked with the storage tray in a self-cleaning mode.

Referring to FIG. 28, the block diagram shows a condition when the apparatus 10 is docked with the storage tray 380 in the self-cleaning mode. Actuating (e.g. depressing) the self-cleaning mode input control 40 disables or shuts off the battery charging circuit 430, and allows the apparatus 10 to energize and be powered by the onboard battery 472. The apparatus 10 then automatically cycles through the self-cleaning mode, and during this cycle the battery charging circuit 430 remains disabled, i.e. the battery 372 does not recharge during the self-cleaning mode. This operational behavior is beneficial because if the battery charging circuit 430 is not disabled and power not supplied by the battery 472 during the self-cleaning mode, the capacity of the wall charger 432 can be exceeded. As noted above, in one embodiment the wall charger 432 can have, for example, an operating power of 35 W. Wall chargers with higher capacity are much more expensive.

Figure 29:
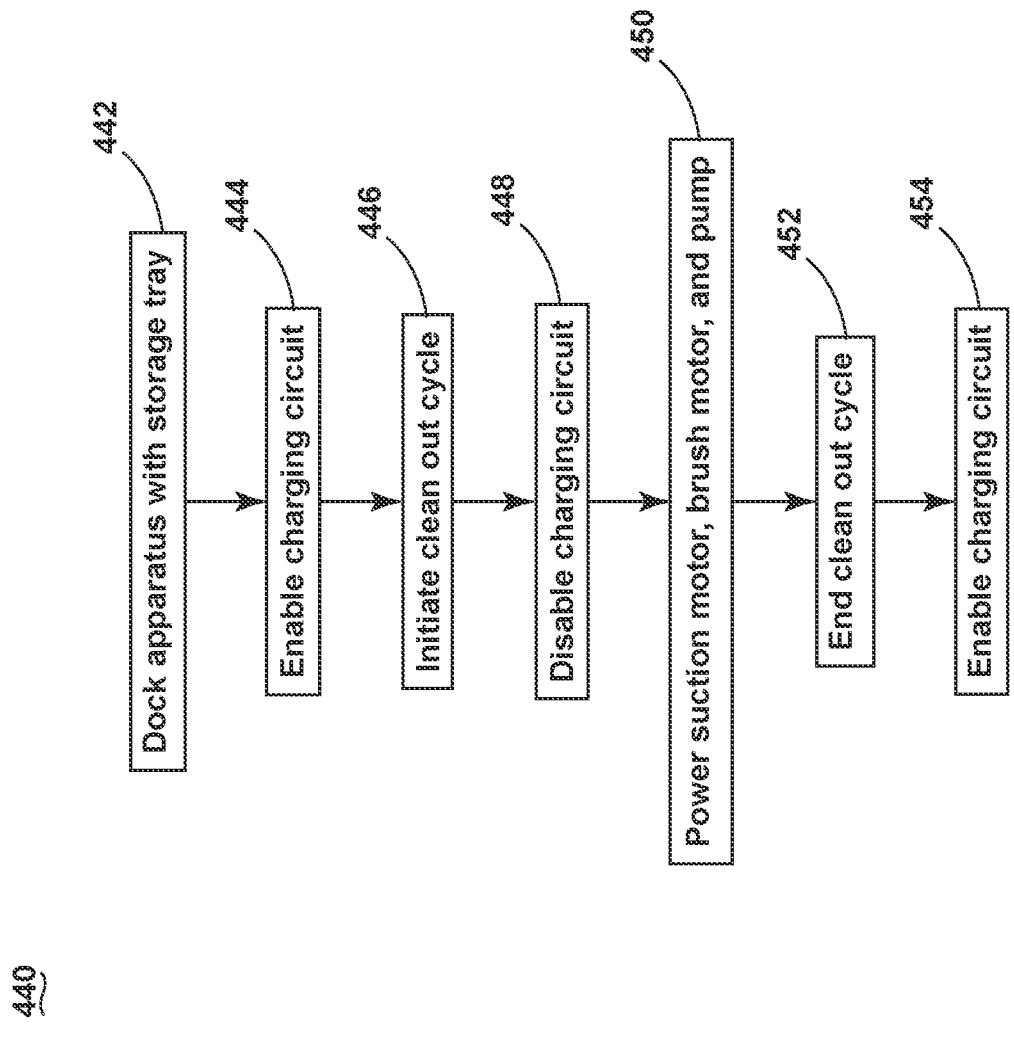
FIG. 29 is a flow chart showing one embodiment of a self-cleaning method for the surface cleaning apparatus.

FIG. 29 depicts one aspect of the disclosure of a self-cleaning method 440 for the apparatus 10 using the storage tray 380. In use, a user at 442 docks the apparatus 10 with the storage tray 380. The docking may include parking the base 14 on the cleaning tray 380 and establishing a closed loop between the fluid delivery and fluid recovery systems of the apparatus 10. For example, the docking can include sealing the brush chamber 104 to establish a sealed cleaning pathway between the fluid distributor 90 and the suction nozzle 54.

At step 444, the charging circuit 430 is enabled when the apparatus 10 is docked with the tray 380 and the charging contacts 382, 384 couple. When the charging circuit 430 is enabled, the battery 372 may begin being recharged.

At step 446, the cleanout cycle for the self-cleaning mode of operation is initiated. The controller 308 can initiate the cleanout cycle based on input from the user, such as by the user pressing the self-cleaning mode input control 40 on the SUI 32. The self-cleaning cycle may be locked-out by the controller 308 when the apparatus 10 is not docked with the storage tray 380 to prevent inadvertent initiation of the self-cleaning cycle.

At step 448, upon initiation of the self-cleaning cycle, such as upon the user pressing the self-cleaning mode input control 40, the charging circuit 430 is disabled, i.e. the battery 372 ceases to recharge.

Pressing the input control 40 at step 446 can energize one or more components of the apparatus 10 to energize and be powered by the onboard battery 472. The self-cleaning cycle may begin at step 450 in which the pump 94 is active to deliver cleaning fluid from the supply tank 20 to the distributor 90 that sprays the brushroll 60. During step 450, the brush motor 96 can also activate to rotate the brushroll 60 while applying cleaning fluid to the brushroll 60 to flush the brush chamber 104 and cleaning lines, and wash debris from the brushroll 60. The self-cleaning cycle may use the same cleaning fluid normally used by the apparatus 10 for surface cleaning, or may use a different detergent focused on cleaning the recovery system of the apparatus 10.

The vacuum motor can be actuated during or after step 450 to extract the cleaning fluid via the suction nozzle 54. During extraction, the cleaning fluid and debris from the sump 410 in the tray 380 is sucked through the suction nozzle 54 and the downstream fluid recovery path. The flushing action also cleans the entire fluid recovery path of the apparatus 10, including the suction nozzle 54 and downstream conduits.

At step 452, the self-cleaning cycle ends. The end of the self-cleaning cycle can be time-dependent, or can continue until the recovery tank 22 is full or the supply tank 20 is empty. For a timed self-cleaning cycle, the pump 94, brush motor 96, and vacuum motor 64 are energized and de-energized for predetermined periods of time. Optionally, the pump 94 or brush motor 96 can pulse on/off intermittently so that any debris is flushed off of the brushroll 60 and extracted into the recovery tank 22. Optionally, the brushroll 60 can be rotated at slower or faster speeds to facilitate more effective wetting, shedding of debris, and/or spin drying. Near the end of the cycle, the pump 94 can de-energize to end fluid dispensing while the brush motor 96 and vacuum motor 64 can remain energized to continue extraction. This is to ensure that any liquid remaining in the sump 410, on the brushroll 60, or in the fluid recovery path is completely extracted into the recovery tank 22.

After the end of the self-cleaning cycle, the charging circuit 430 is enabled to continue to recharging the battery 472 at step 454.

To the extent not already described, the different features and structures of the various embodiments of the invention, may be used in combination with each other as desired, or may be used separately. That one surface cleaning apparatus is illustrated herein as having all of these features does not mean that all of these features must be used in combination, but rather done so here for brevity of description. Furthermore, while the surface cleaning apparatus 10 shown herein has an upright configuration, the surface cleaning apparatus can be configured as a canister or portable unit. For example, in a canister arrangement, foot components such as the suction nozzle and brushroll can be provided on a cleaning head coupled with a canister unit. Still further, the surface cleaning apparatus can additionally have steam delivery capability. Thus, the various features of the different embodiments may be mixed and matched in various vacuum cleaner configurations as desired to form new embodiments, whether or not the new embodiments are expressly described.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The invention claimed is:

1. A method for self-cleaning a surface cleaning apparatus docked at a cleaning tray, the surface cleaning apparatus comprising a battery, a fluid delivery system, and a recovery system having a recovery pathway, and the cleaning tray configured to recharge the battery of the surface cleaning apparatus, the method comprising:
    enabling a battery charging circuit of the surface cleaning apparatus following docking the surface cleaning apparatus with the cleaning tray;
    initiating, by a controller of the surface cleaning apparatus, a self-cleaning mode of operation for the surface cleaning apparatus in response to actuation of a self-cleaning mode input control on the surface cleaning apparatus;

running an unattended automatic cleanout cycle to self-clean at least a portion of the recovery pathway of the surface cleaning apparatus, wherein running the unattended automatic cleanout cycle comprises powering a pump, a brush motor, and a vacuum motor with the battery;

automatically disabling the battery charging circuit of the surface cleaning apparatus that controls recharging of the battery during the unattended automatic cleanout cycle; and automatically enabling the battery charging circuit after the end of the unattended automatic cleanout cycle to recharge the battery of the surface cleaning apparatus.

2. The method of claim 1, wherein running the unattended automatic cleanout cycle comprises powering at least one of the brush motor and the pump first, and thereafter powering the vacuum motor.

3. The method of claim 1, wherein running the unattended automatic cleanout cycle comprises:
rotating a brushroll of the surface cleaning apparatus; and
spraying cleaning fluid onto the brushroll of the surface cleaning apparatus.

4. The method of claim 3, wherein running the unattended automatic cleanout cycle comprises:
extracting cleaning fluid from the brushroll and depositing cleaning fluid in a recovery tank of the surface cleaning apparatus.

5. The method of claim 4, wherein running the unattended automatic cleanout cycle comprises powering the vacuum motor after powering the brush motor and the pump.

6. The method of claim 1, comprising engaging a charging contact on the surface cleaning apparatus with a charging contact on the cleaning tray, wherein the charging contacts are engaged and remain engaged during self-cleaning cycle.

7. The method of claim 1, wherein running the unattended automatic cleanout cycle comprises:
powering the brush motor and the pump by the battery, whereby cleaning fluid is sprayed on a brushroll while the brushroll rotates, without the vacuum motor being powered; and
powering the vacuum motor by the battery after the brush motor and the pump are powered, whereby cleaning fluid is extracted and deposited into a recovery tank of the surface cleaning apparatus and a portion of the recovery pathway is flushed out.

8. The method of claim 1, comprising displaying a self-cleaning status and a battery charge status on a display of the surface cleaning apparatus.

* * * * *